United States Patent [19]
Meinzer et al.

[11] Patent Number: 5,640,472
[45] Date of Patent: Jun. 17, 1997

[54] FIBER OPTIC SENSOR FOR MAGNETIC BEARINGS

[75] Inventors: Richard A. Meinzer; Thomas W. Grudkowski, both of Glastonbury; Evan C. Polley, Hartford, all of Conn.

[73] Assignee: United Technologies Corporation, Hartford, Conn.

[21] Appl. No.: 478,701

[22] Filed: Jun. 7, 1995

[51] Int. Cl.$^6$ ............................................. G02B 6/26
[52] U.S. Cl. ....................................... 385/26; 385/24
[58] Field of Search ............................... 385/15, 24, 25, 385/26, 57

[56] References Cited

U.S. PATENT DOCUMENTS

| | | | |
|---|---|---|---|
| 3,327,584 | 6/1967 | Kissinger | 356/375 |
| 3,917,988 | 11/1975 | Payne | 385/25 X |
| 3,940,608 | 2/1976 | Kissinger et al. | 250/227.28 |
| 4,160,204 | 7/1979 | Holmgren et al. | 324/207.16 |
| 4,247,764 | 1/1981 | Kissinger | 250/205 |
| 4,254,331 | 3/1981 | Dorman et al. | 250/205 |
| 4,438,987 | 3/1984 | Kapaan | 385/57 X |
| 4,472,052 | 9/1984 | Löfgren | 385/26 X |
| 4,488,813 | 12/1984 | Kissinger et al. | 356/375 |
| 4,674,882 | 6/1987 | Dorman et al. | 356/373 |
| 4,694,160 | 9/1987 | Hoogenboom et al. | 250/203.2 |
| 4,701,611 | 10/1987 | Kissinger | 250/208.5 |
| 4,749,249 | 6/1988 | Hockaday et al. | 385/26 |
| 4,761,073 | 8/1988 | Meltz et al. | 356/32 |
| 4,814,603 | 3/1989 | Philips | 250/227.21 |
| 4,816,759 | 3/1989 | Ames et al. | 324/207.17 |
| 4,900,117 | 2/1990 | Chen | 385/26 |
| 5,042,897 | 8/1991 | Meltz et al. | 385/37 |
| 5,048,913 | 9/1991 | Glenn et al. | 385/37 |
| 5,061,032 | 10/1991 | Meltz et al. | 385/37 |
| 5,287,423 | 2/1994 | Anthony | 385/26 |
| 5,401,956 | 3/1995 | Dunphy et al. | 250/227.18 |
| 5,436,988 | 7/1995 | Narendran | 385/26 |

FOREIGN PATENT DOCUMENTS

| | | |
|---|---|---|
| 0004117A | 9/1979 | European Pat. Off. . |
| 0285053A2 | 10/1988 | European Pat. Off. . |
| 3020454 | 12/1980 | Germany . |
| 1540907 | 2/1979 | United Kingdom . |
| 2178165 | 2/1987 | United Kingdom . |

OTHER PUBLICATIONS

G. J. Philips, Fritz Hirschfeld, "Rotating Machinery Bearing Analysis", Mechanical Engineering, Jul. 1980, pp. 28–33.

C. Menadier, C. Kissinger, H. Adkins, "The Fotonic Sensor", Instruments & Control Systems, vol. 40, Jun. 1967, pp. 114–120.

InTech, "The Industry", Jun. 1980, pp. 9–10, 14, 16, 20 and 22.

Philtec, Inc., "Fiber Optic Displacement Sensors", Series 88 Sensors Spec Sheets, pp. 1–12, Jun. 1993.

Philtec, Inc., "Fiber Optic Sensors Replace Eddy Current Proximity Probes", Application Notes, 5 sheets, vol. 2, No. 3 (No Date).

(List continued on next page.)

*Primary Examiner*—John D. Lee
*Attorney, Agent, or Firm*—Gerald L. DePardo

[57] ABSTRACT

A fiber optic sensor for magnetic bearings includes a stator 12, a rotor 14, and an optical transmit/receive fiber 50 which propagates transmit light 112 which is launched across a gap 15 between the stator and the rotor and which receives reflected light 114 that is reflected off of the rotor 14 and travels along the fiber 50 as the light 116. The gap 15 distance is determined by the change in intensity of the return light 114. The transmit/receive fiber 50 may be located radially through or longitudinally along the stator 12. The receive light 116 is detected by a photodetector 120 which provides an electrical signal to a control circuit 124 which controls electromagnetic coils 31–34 of the magnetic bearing. Alternatively, two separate fibers may be used for the transmit and receive light. Also, time or wavelength multiplexing may be employed to allow for remote optical source and detection/control of the gap 15 distance. Further, a plurality of such sensors may be used around the gap 15. Also, a temperature sensor may be embedded within the distance sensor. Further, radial and/or axial gaps may be measured.

32 Claims, 13 Drawing Sheets

OTHER PUBLICATIONS

Gerald J. Philips, "F–O Displacement Sensors For Dynamic Measurements", Sensors, The Journal of Machine Perception, 4 sheets, Sep. 1992.

Curtis Kissinger, "Displacement Measurement By Fiber Optics", Measurements & Control, Apr. 1988, 6 sheets.
International Search Report for PCT/US96/08431, mailed Sep. 24, 1996; for the PCT application that corresponds to United States Application 08/478,701.

FIBER OPTIC SENSOR FOR MAGNETIC BEARINGS

TECHNICAL FIELD

This invention relates to magnetic bearings and more particularly to optical sensing for magnetic bearings.

BACKGROUND ART

It is known in the art that magnetic bearings have a rotating member (or rotor) and a stationary member (or stator) concentrically located with respect to each other and that the magnetic bearing (and its associated control circuitry) typically controls the radial or axial distance between the rotating rotor and the stationary stator. For example, the stator may be located concentrically internal to the rotor or visa versa. As is also known, a magnetic bearing may use adjustable electro-magnetic forces generated by current flowing through coils wrapped around the stator, as controlled by a control circuit, to adjust the distance between the stator and rotor.

In particular, a "radial" magnetic bearing adjusts the radial distance between the concentrically located stator and rotor. As radial forces are exerted on the rotor, the electromagnetic forces must be adjusted so as to return the gap between the stator and the rotor to a substantially constant equal value around the circumference of the rotor/stator gap.

Distance sensors are typically used to measure the distance of the gap and to provide input signals to the control circuit to adjust the forces by adjusting the current through the coils. The type of distance sensor commonly used is an inductive or eddy current non-contacting sensor having a diameter of about ¼", e.g., an inductive sensor by Kaman Instrumentation Corporation, Colorado Springs, Colo., Part No. 854078-001.

A typical inductive sensor comprises two inductors (or coils), one (active) coil which is influenced by the presence of a conducting target and a second (balance) coil which provides temperature compensation. Each coil is typically connected in parallel with a capacitor, and the two coil-capacitor pairs make up two legs of a bridge circuit. The other two legs of the bridge circuit comprise resistors. The bridge circuit has a high frequency ac excitation (e.g., 1 Mhz) applied across two legs of the bridge and an output voltage is measured across the other two bridge legs. Magnetic flux lines from the active coil pass across the measurement gap to a conductive target, producing eddy currents in the surface of the target. As the target comes closer to the active coil, the eddy currents become stronger, which changes the impedance of the active coil and causes a bridge unbalance and a corresponding change in output voltage related to target position. This unbalance voltage may be demodulated, low-pass filtered, and/or linearized to produce a dc output voltage proportional to the gap.

In a radial magnetic bearing, one or more inductive sensors may be used to measure the gap between the rotor and the stator. Thus, if the output voltage from the aforementioned bridge circuit is monitored by the aforementioned control circuit, the control circuit can measure the change in gap and adjust the current in the electromagnetic coils to compensate accordingly. More specifically, the active coil is typically located on one member of the magnetic bearing and the opposite member of the bearing acts as the target. Also, if the opposite (or target) member of the bearing is not conductive or has variable or non-uniform magnetic and/or electrical properties, a metallic ring made of an conductive material, e.g., copper, may be placed thereon to enhance distance measuring performance. For example, if the active coil is located on the stator, the metallic ring would be located opposite the coil on the rotor. Such an inductive sensor is described in U.S. Pat. No. 4,816,759, entitled "Inductive Sensor for Detecting Displacement of Adjacent Surfaces", to G. Ames et al, and U.S. Pat. No. 4,160,204, entitled "Non-contact Distance Measurement System", to R. Denny et al.

For magnetic bearing applications, the gap distance sensors are typically placed as close as possible to the magnetic bearing (and, thus, the electro-magnetic coils), so as to allow precise control of the gap between the rotor and the stator. However, one drawback of using an inductive sensor is that the inductive sensor cannot be placed too close, e.g., less than 0.25 inches, to the electro-magnetic coils of the magnetic bearing. If the inductive sensor is placed too close to the magnetic bearing, the inductive effects caused by changes in electro-magnetic flux generated by changing current through the magnetic bearing coils will corrupt the eddy currents sensed by the inductive sensor, thereby producing an erroneous distance measurement. Another disadvantage of an inductive sensor is that the resistivity of the copper ring changes over time and temperature, which changes the eddy currents and introduces errors in the distance measurement. Further, another drawback to using an inductive sensor is the high cost, e.g., $4,000.00 for a set of four sensors around a radial bearing.

Alternatively, a capacitive-type sensor may be used to determine the distance between the rotor and the stator. In that case, a variable capacitor is used to sense gap distance and the resulting capacitance change is converted into an electrical signal indicative of the gap. The most common form of variable capacitor is the parallel plate capacitor with a variable air gap. However, such capacitive sensors may also be adversely affected by electro-magnetic interference (EMI) generated by the electro-magnetic coils of the magnetic bearing. Further, capacitive sensors are adversely affected by parasitic (or stray) capacitances generated by other nearby metallic components.

Thus, it would be desirable to provide a sensor which can be located very close to or within the electro-magnets of a magnetic bearing, which takes up minimum space, which has a low cost, and which is not sensitive to electro-magnetic interference, thereby allowing for a low cost precise adjustment of the gap between the rotor and the stator at the magnetic bearing.

DISCLOSURE OF INVENTION

Objects of the present invention include provision of a position sensor for magnetic bearings which can be placed within or very near the electromagnets of the magnetic bearing and is insensitive to electro-magnetic interference and which is low cost.

According to the present invention, a magnetic bearing comprises a stator; a rotor, concentrically located with respect to the stator, which rotates relative to the stator, there being a variable gap between the rotor and the stator and electromagnetic forces acting between the stator and the rotor which adjust the gap; a plurality of optical transmit/receive means, disposed on the stator, each receiving and propagating a corresponding transmit light, for launching the transmit light across the gap, the transmit light being reflected off of the rotor as receive light, and each receiving and propagating the receive light, the intensity of the receive light being indicative of the gap; and detection means, responsive to the receive light from each of the transmit/ receive means, for coupling the receive light from each of the transmit/receive means onto a single optical waveguide and for providing at least one electrical receive signal indicative of the intensity of the receive light from predetermined ones of the transmit/receive means.

According still further to the present invention, a least one electromagnetic coil is disposed on the stator; and control means, are responsive to the receive signal, for measuring the gap and for providing an electrical control signal to the coil to adjust the gap.

According still further to the present invention, the optical transmit/receive means comprises two separate optical fibers, a transmit fiber for receiving and propagating the transmit light and a receive fiber for receiving and propagating the receive light.

According further to the present invention, the optical transmit/receive means comprises a single optical transmit/receive fiber for receiving and propagating the transmit light and for receiving and propagating the receive light.

This invention represents a significant improvement over the prior art by providing a fiber optic gap sensing device which can be mounted directly within or very near the electro-magnets of the magnetic bearing. Another advantage of the present invention is that a metallic (e.g., copper) ring is not required around the rotor and that changes in the conductivity of the rotor or ring surface have no effect on the distance measurement, unlike prior art inductive-type sensors. Further, the invention allows for a plurality of distance sensors to be located around the circumference of the radial gap to allow for fault tolerance and improve overall accuracy by allowing for signal conditioning, averaging, and/or normalization to compensate for gradual and/or fast changes in the rotor surface reflection. Still further, the invention allows for low cost sensing of gaps in magnetic bearings and other gap sensitive rotating devices. Moreover, the invention provides a sensor of minimal diameter, thereby having a minimal effect on magnetic circuit performance of the magnetic bearing. Still further, the invention combines optical distance measurement with temperature sensing in a single device.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
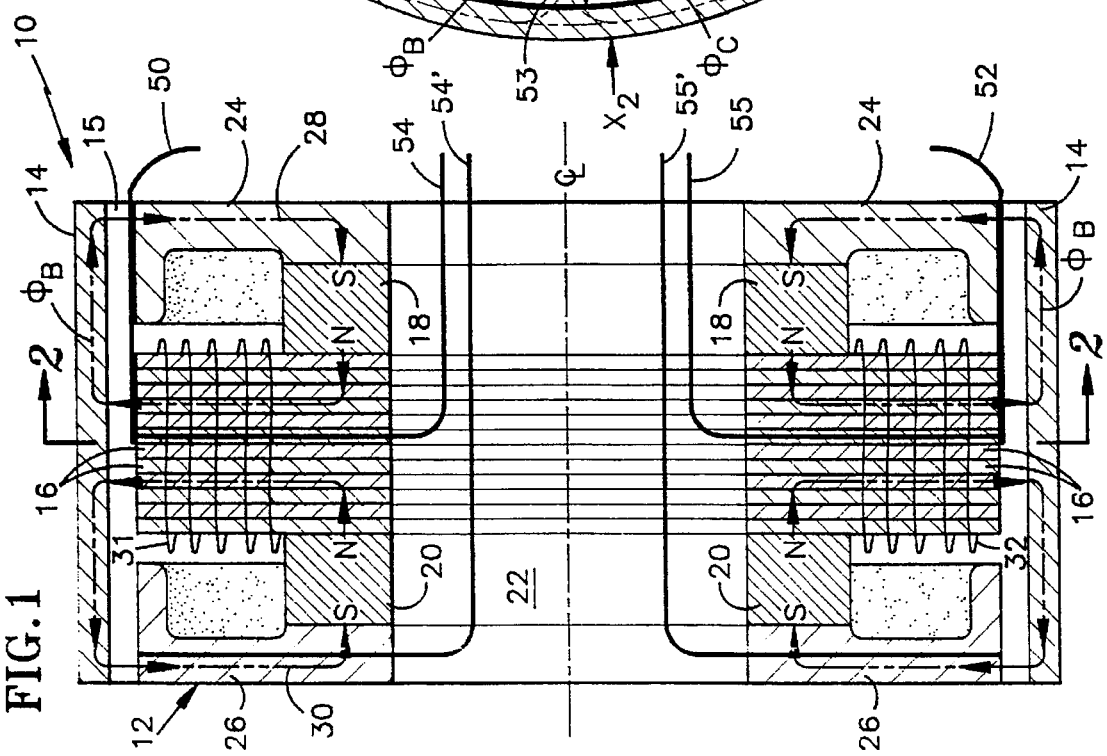
FIG. 1 is a side view of a magnetic bearing having optical gap sensors in accordance with the present invention.

Referring to FIG. 1, a radial magnetic bearing 10 comprises a stationary member or stator 12, a rotating member or rotor 14, and a gap 15 between the outer diameter of the stator 12 and the inner diameter of the rotor 14. The stator 12 comprises a plurality of centrally located laminations 16, e.g., about 95 layers or laminations, made of a high grade low-loss high permeability electrical steel with good high frequency response characteristics, e.g., Rotelloy 5®, cobalt magnetic steel. The thickness of each lamination layer 16 is about 0.004" to 0.010" (0.010 to 0.0254 cm) and the total stacked thickness for all the laminations 16 is about 0.75 inch (1.905 cm). Other lamination thicknesses and total lamination thicknesses may be used if desired.

The laminations 16 are sandwiched between two permanent magnets 18,20. Each of the permanent magnets 18,20 have a circular donut shape. Other shapes for the permanent magnets 18,20 may be used if desired. In the center of the stator is a hollow region 22.

The south poles of the permanent magnets 18,20 are connected to one side of supporting arms 24,26, respectively at one end of the arms 24,26 and the north poles are connected to opposite sides of the laminations 116. The other end of the arms 24,26 make up a portion of the outer diameter of the stator 12. The arms 24,26 are made of high strength high permeability low loss steel, e.g., low carbon (e.g., 0.01–0.02% carbon) steel, such as Arnon 5® or AISI 1018 steel.

The permanent magnets 18,20 provide a DC magnetic field bias which places an outward radial force from the stator 12 to the rotor 14 around the circumference of the stator and rotor. The flux path (or circuit) for the magnet 18 is indicated by a dash line 28 which exits the north pole of the permanent magnet 18, travels along the laminations 16, crosses the gap 15, travels along the rotor 14, crosses the gap 15 to enter the support member 24, and returns to the south pole of the permanent magnet 18 to complete the magnetic circuit flux path for the permanent magnet 18. A symmetrical magnetic flux circuit exists for the permanent magnet 20, as indicated by a dashed line 30. Also, electrical wires or coils 31,32,33,34 are wrapped around the laminations 16 as indicated in FIGS. 1 and 2.

Figure 2:
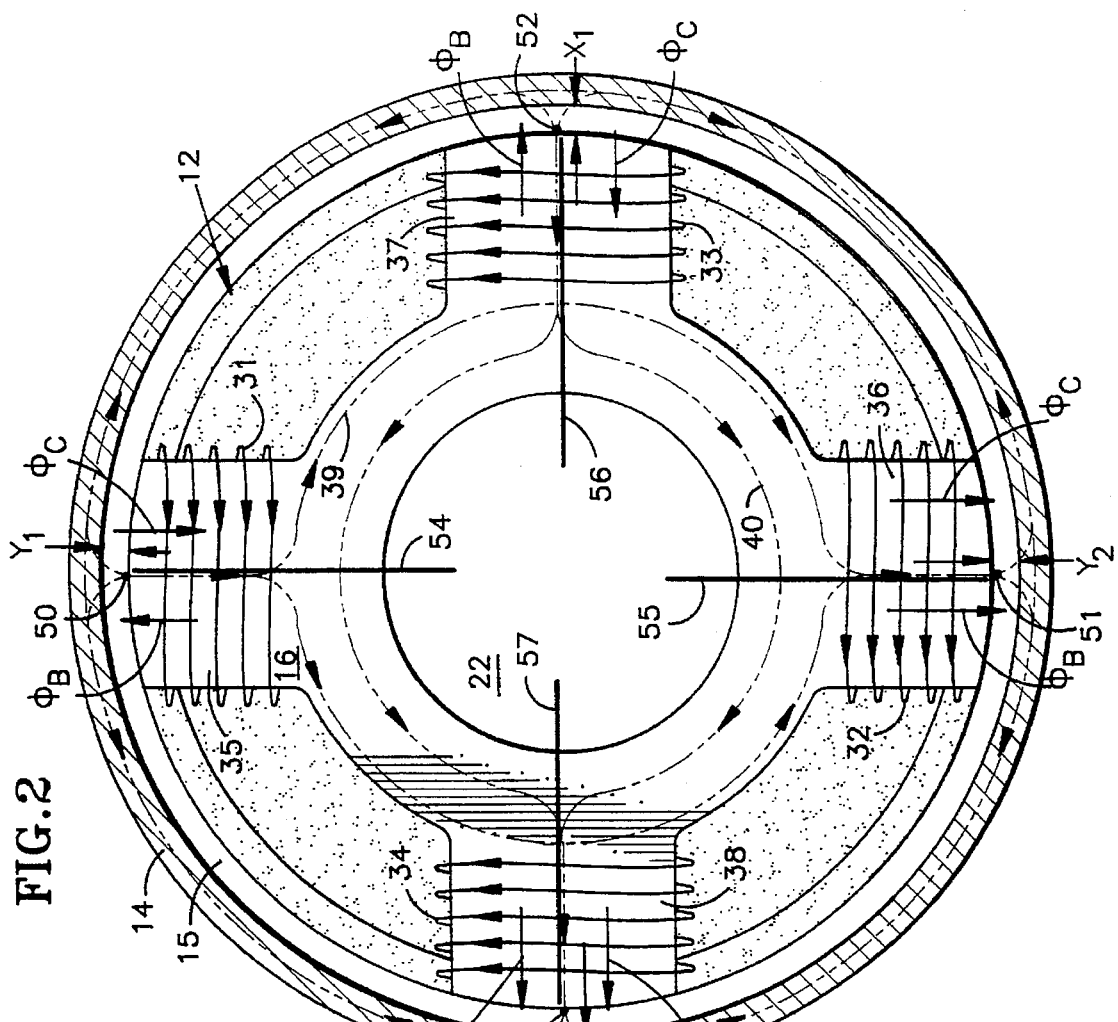
FIG. 2 is a top cutaway view of the magnetic bearing of FIG. 1 showing a four pole stator and four measurement gaps in accordance with the present invention.

Referring to FIG. 2, the laminations 16 in the stator 12 have four poles 35,36,37,38 around which the coils 31–34, respectively, are wrapped. The stator may have more or less poles if desired. The coils 31–34 carry current which generate variable electro-magnetic fields which adjust for radial forces exerted on the rotor and/or stator which cause the gap 15 to become non-uniform around the circumference of the stator.

More specifically, the gap 15 is measured in four places at the center or near the center of the poles 35–38 of the laminations 16. In particular, the distances measured are indicated as $y_1$, $x_1$, $y_2$, $x_2$ going in a counter-clockwise direction around the stator 12. The electro-magnetic forces operate to counter external forces exerted on the rotor 14 or stator 12 to keep the gap 15 uniform around the circumference of stator 12. For example, in FIG. 2, if radial forces cause the stator 12 to be forced upward or the rotor 14 to be forced downward, the gap distance $y_2$ will become larger than the gap distance $y_1$. In that case, current will be driven through the coils 31,32 in a direction so as to create a control flux $\phi_c$ which is opposite in direction to the bias flux $\phi_b$ across the gap $y_1$ and which is in the same direction as the bias flux $\phi_b$ across the gap $y_2$. As a result, the total attractive forces across the gap $y_1$ are reduced and the total attractive forces across the gap $y_2$ are increased so as to make $y_1$ and $y_2$ equal. In a similar fashion, if a horizontal radial force is exerted on the stator and/or rotor so as to cause the gap distance $x_2$ to be greater than the gap distance $x_1$, a current is forced through the coils 33,34 so as to create a control flux $\phi_c$ which is in the same direction as the bias flux $\phi_b$ across the gap $x_2$ and is in the opposite direction to the bias flux $\phi_b$ across the gap $x_1$. This orientation of the control flux $\phi_c$ increases the attractive forces across the gap $x_2$ and decreases the attractive forces across the gap $x_1$ so as to force the gap $x_2$ to equal the gap $x_1$.

The current through the coils 31,32 that creates the control flux that adjusts the gaps $y_1$ and $y_2$ is indicated by a dashed line 39 which, for the above example, is oriented downwardly along the upper stator pole 35 and splits into two substantially equal paths along the back iron of the stator and then recombines at the lower pole 36 of the stator 12. The flux path 39 travels across the gap $y_2$ and then splits again into two substantially equal paths and travels around half the circumference of the rotor and recombines and then crosses the gap $y_1$ to the upper pole 35 of the stator 12.

Similarly, the current in the coils 33,34 which creates the control flux $\phi_c$ that adjusts the gaps $x_1$ and $x_2$ for the above example causes the flux $\phi_c$ to propagate from right to left along the pole 37 of the stator 12 and separates into two substantially equal paths along the back iron of the stator and then recombines again on the left side pole 38 of the stator 12 as indicated by a dash line 40. Similar to the flux 39, the flux 40 travels across the gap $x_2$ and then splits into two substantially equal paths and travels around half the circumference of the rotor 14 and recombines and then crosses the gap $x_1$ to enter the stator pole 37 on the right side. The coils 31,32 may be connected together in series and driven by a voltage applied across them to create the control flux $\phi_c$ in the y-direction. Similarly, the coils 33,34 may be connected together in series and driven by a voltage applied across them to create the control flux $\phi_c$ in the x-direction.

Referring now to FIGS. 1 and 2, an optical fiber 50 is disposed along the longitudinal length of the outer diameter surface along the upper pole 35 of the stator 12. The optical fiber 50 is used to measure the gap distance $y_1$ to allow the gap $y_1$ to be precisely controlled using the electro-magnetic control flux $\phi_c$ discussed hereinbefore. In a similar fashion, optical fibers 51–53 measure the gaps $y_2$, $x_1$ and $x_2$, respectively. The operation of the optical fibers 51–53 are discussed hereinafter. Instead of or in addition to the longitudinally mounted fibers 50–53, radially mounted fibers 54–57 may be used for measuring the gap distances, as discussed hereinafter.

Figure 3:
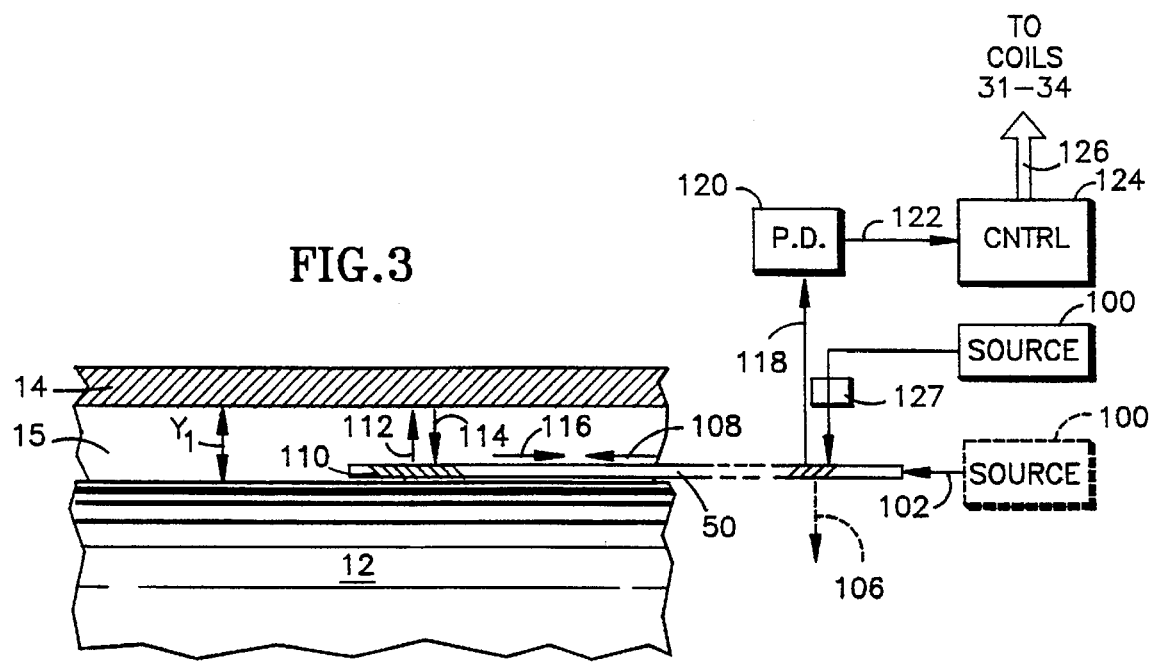
FIG. 3 is a side cutaway view of a longitudinally mounted combined receive/transmit optical fiber in accordance with the present invention.

Referring now to FIG. 3 the optical fiber 50 measures the gap $y_1$ between the stator 12 and the rotor 14, as follows. An optical source 100, e.g., a laser diode or a broad wavelength band source, provides an output light signal 102 which is incident on a side of the fiber 50. The source light 102 is incident on an angled fiber Bragg grating 104 which reflects a predetermined amount (e.g., 99%) of the source light 102 at a predetermined reflection wavelength $\lambda_R$ along the fiber as indicated by a line 108 and passes the remaining light out of the fiber as indicated by a line 106. The light 108 propagates along the fiber 50 and is incident on a second angled fiber Bragg grating 110 which reflects out of the fiber 50 a predetermined amount (e.g., 99%) of the light 108 at the predetermined reflection wavelength $\lambda_R$ as indicated by a line 112. The optical properties of the angled gratings 104,110 are discussed in U.S. Pat. Nos. 5,061,032, entitled "Optical Waveguide Embedded Light Redirecting and Focussing Bragg Grating Arrangement" to Meltz et al, and 5,042,897, entitled "Optical Waveguide Embedded Light Redirecting Bragg Grating Arrangement" to Meltz, et al.

The light 112 exits the fiber 50 and is incident on the inner surface of the rotor 14 which reflects light back across the gap $y_1$ as indicated by a line 114. The light 114 re-enters the fiber 50 from the side and is incident on the grating 110 which reflects a predetermined amount (e.g., 98%) of the light 114 at the reflection wavelength $\lambda_R$ so as to propagate along the fiber 50 as indicated by a line 116. The light 116 is incident on the grating 104 which reflects a predetermined portion of the light 116 at the reflection wavelength $\lambda_R$ out of the fiber 50 as indicated by a line 118. The light 118 is incident on a photodetector (or optical detector or photodiode) 120 which provides an electrical signal on a line 122 indicative of the intensity of the light 118 incident thereon. To prevent the light 118 from affecting the optical source 100, the source 100 may have a built in optical isolator, or, alternatively, an external optical isolator 127 may be used if desired. Multiple gratings, and/or broad or narrow reflection wavelength-band gratings may be used if desired.

The electrical signal on the line 122 is fed to a control circuit (or control logic) 124. The control circuit 124 contains known control electronic components sufficient to provide the functions discussed herein. Alternatively, the control circuit 124 may be a programmed digital computer with the appropriate analog to digital and digital to analog interfaces. The control circuit 124 is responsive to a plurality of input signals (not shown) from the optical sensors of the magnetic bearing 10 and provides a plurality of output signals 126 which drive the coils 31–34 of the magnetic bearing 10. The control circuit 124 may accept inputs from and drive the coils of a plurality of magnetic bearings if desired.

Alternatively, the source 100 (shown as a dashed box) may provide the light 102 incident on one end of the fiber 50 which is incident on the grating 104. In that case, the angled grating 104 reflects a predetermined amount (e.g., 50%) of the incident light 102 at the reflection wavelength $\lambda_R$ out of the fiber 50, as indicated by the line 106 and passes the remaining light so as to propagate along the fiber 50 as indicated by the line 108. Similarly, 50% of the return light 116 is reflected out to the photo-detector 120 as indicated by the line 118. Alternatively, the photodetector 120 and source 100 may be located at the end of the fiber 50. In that case, the grating 104 would not be needed because light would enter and exit from the end of the fiber 50 but optical isolation may be needed as discussed hereinbefore. Further, alternatively, the optical detector 120 may be located at the end of the fiber and the source light 102 may be incident on the side of the fiber.

A similar configuration exists for the other three fibers 51,52,53 (FIG. 2) discussed more hereinafter with FIGS. 11–15.

Figure 4:
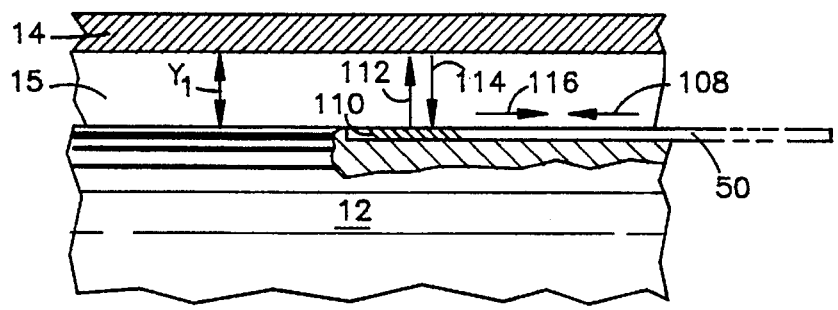
FIG. 4 is a side cutaway view of a longitudinally mounted partially embedded combined receiver/transmitter optical fiber in accordance with the present invention.

Referring now to FIG. 4, in an alternative embodiment, the fibers 50–56 may be placed in a notch 130 in the stator 12 such that the fibers 50–53 do not protrude or take up any space in the gap spacings $y_1$, $y_2$, $x_1$, $x_2$.

Figure 5:
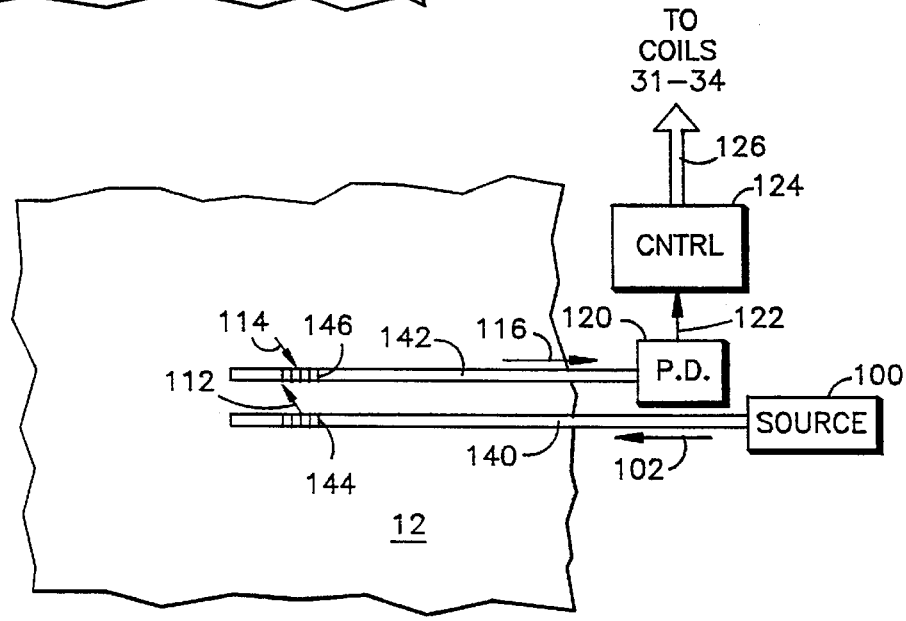
FIG. 5 is a side cutaway view of two longitudinally mounted receive and transmit optical fibers in accordance with the present invention.

Referring to FIG. 5, alternatively, instead of using the single fiber 50 for transporting the transmit light 112 and the received light 114 (as indicated in FIG. 3), the fiber 50 may be used for the transmit light and a separate fiber 142 used for the receive light. The fiber 140 carries the source light 102 from the source 100 to a slanted grating 144 (which in this view appears straight) which reflects a predetermined amount of light out of the fiber 140 across the gap $y_1$ to the rotor 14 (not shown in this view), as indicated by the line 112 (pointing out of the page) similar to that of FIG. 3. Similarly, the reflected light 114 from the rotor 14 is incident on the fiber 142 from the side and is incident on a slated grating 146 which redirects the light 114 to propagate along the fiber 142 as the light 116 as discussed hereinbefore. The light 116 exits the fiber 142 and is incident on the photodetector 120 which produces an electrical signal on the line 122 to the control circuit 124 which provides electrical output signals to the coils 31–34 on the lines 126, as discussed hereinbefore. It should be understood that the gratings 144,146 may be the same as the grating 110 described hereinbefore with respect to FIGS. 3 and 4; however, the gratings 144,146 do not appear slanted in FIG. 5 because FIG. 5 is a top view used to show the side-by-side orientation of the two fibers 140, 142. Also, the fiber 50 of FIG. 3 could be used as the fibers 140,142 if desired.

Figure 6:
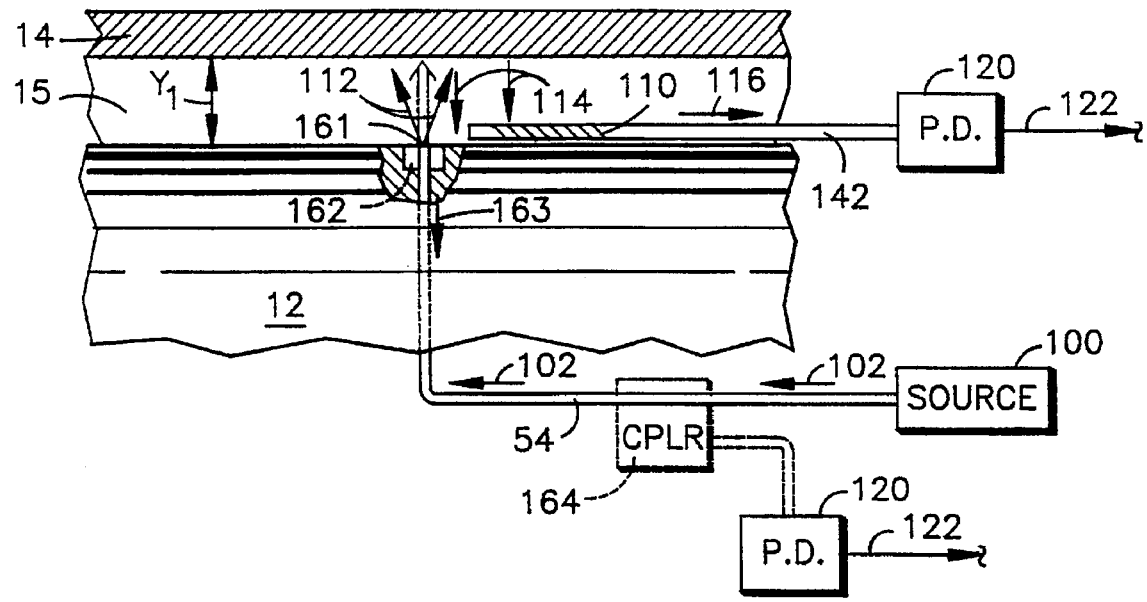
FIG. 6 is a side cutaway view showing a radially mounted transmit optical fiber and a longitudinally mounted receive optical fiber in accordance with the present invention.

Referring now to FIG. 6, instead of the two fibers 140,142 (FIG. 5) being located side-by-side longitudinally along the stator 12, one or both of the fibers 140,142 may be installed perpendicular to or radially through the stator 12. In that case, the fiber 54 is oriented along the inner hollow region 22 of the stator 12 (FIG. 1) along the longitudinal direction and then curves to become radial as indicated in FIGS. 1, 2 and 6. The fiber 54 may be placed radially through the laminations 16 or, alternatively, through the support member 26 as indicated in FIG. 1 by the numerals 54',55'. In either case, the light 102 transmitted from the source 100 propagates along the fiber 54 (FIG. 6) and exits from the end face 161 of the fiber 54 to be radially projected from across the gap 15 as indicated by the lines 112 and is reflected off the rotor 14 as indicated by the reflected light 114. The end-face 161 of the fiber 54 may be coated with an anti-reflection (AR) coating to reduce internal reflection of the light 102. The light 114 is incident on the return fiber 142 having the grating 110 which directs the light into the fiber 142 so as to propagate along the fiber 142 as indicated by the line 116. If the fiber 142 may be the same as the fiber 50 of FIG. 3. The light 116 is then fed to the photodetector 120 in a similar fashion to that described hereinbefore. In this configuration, a grating is not needed for the fiber 54 because the light propagates out the end of the fiber instead of being redirected out of the side.

Instead of the light 112 being divergent from the end of the fiber 54, a collimating lens such as a GRIN (Gradient Index) lens 162 may be placed at the end of the fiber 54 to cause the light 112 transmitted across the gap 15 to be collimated as indicated by dashed lines 159. In that case, the reflected light 114 has greater intensity reflected back along the return fiber 142. Alternatively, the lens 162 may provide focussed light which is focussed onto the rotor 14. In that case, the reflected light 114 will be scattered at a wider angle, thereby allowing the transmit and return fiber to be farther apart without exhibiting a linear front slope region (discussed hereinafter). To optimize bi-directional motion measurement, the center of the focal point region of the light should be set to the average distance for the gap 15, the focal region (or depth-of-focus or Rayleigh range) being greater than 10 mils. This is greater than the maximum movement of the rotor and, thus, the rotor will remain in sharp focus. Any other lens may be used if desired to provide the same functions described herein.

Further, instead of having the return fiber 142 receive the reflected light 114, the transmit fiber 54 may also receive the reflected light 114, as indicated by a line 163. In that case, an optical 50/50 (or 3 dB) coupler 164 may be used to couple-out the return light 163 as indicated by a line 165 along a fiber 166 to the optical detector 120. Also, in that case, the source 100 should be protected from light reentering the source 100 by an optical isolator internal or external to the source 100, as discussed hereinbefore with FIG. 3. Further, in that case, if the lens 162 is used to provide the collimated light 159, the intensity of the light 163 reflected back into the fiber 54 will be a maximum. Alternatively, instead of the coupler 164, an angled fiber grating (not shown), such as the grating 104 discussed hereinbefore with FIG. 3, may be used to couple-out the return light 163 from the fiber 54 to the optical detector 120.

Figure 7:
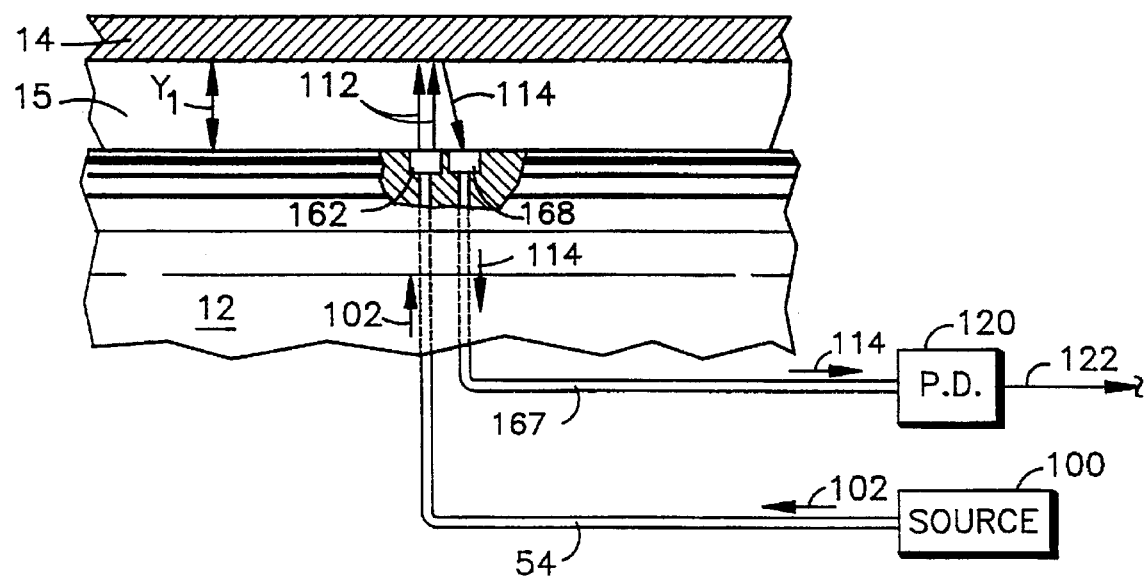
FIG. 7 is a side cutaway view of a radially mounted receive and transmit optical fibers in accordance with the present invention.
Figure 8A:
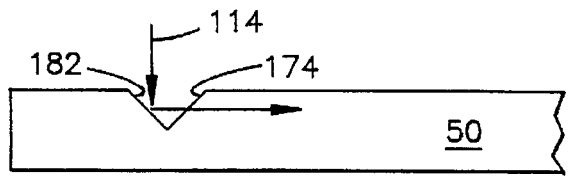
FIG. 8, illustrations (a)–(f), are side views of optical fibers, in accordance with the present invention.
Figure 8B:
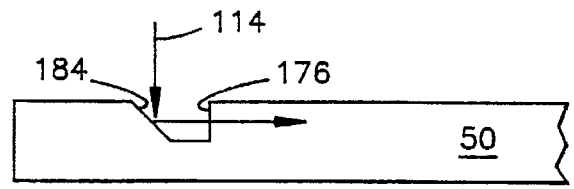
Figure 8C:
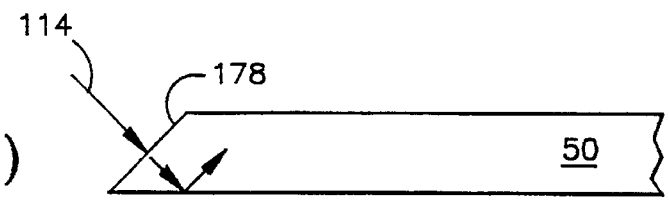
Figure 8D:
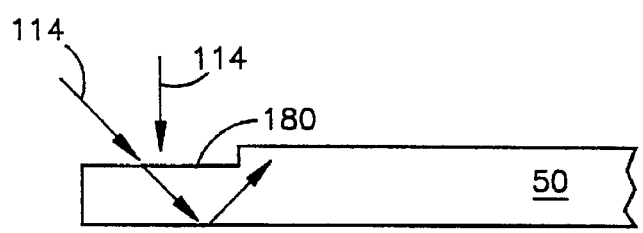
Figure 8E:
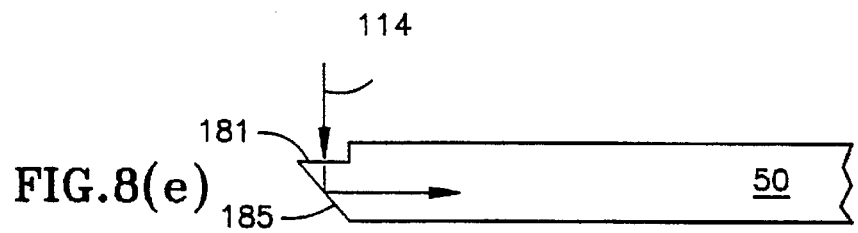
Figure 8F:
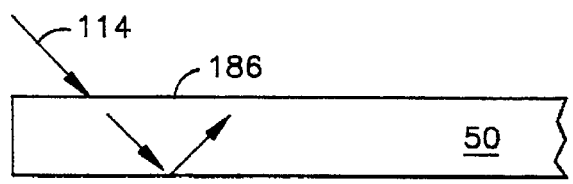

Referring now to FIG. 7, if the fiber 142 in FIG. 6 is also installed radially through the stator as indicated by a fiber 167, the grating 110 (FIG. 6) is not needed for the return signal. In that case, the GRIN lens 162 may be used at the end of the fiber 54, and an additional GRIN lens 168 may be used for the return light 114 to focus and capture more of the reflected light 114 to be directed into the fiber 167 as the light 114. It should be understood that one or both of the lenses 162,168 are not required, but may be used to increase the intensity of light transmitted across the gap 15 and/or increase the amount of light reflected into the return fiber.

Figure 9:
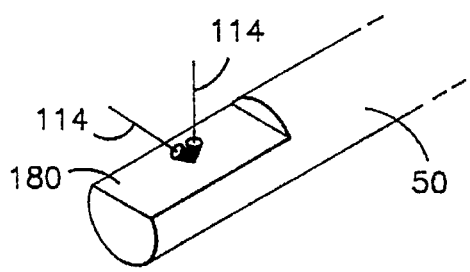
FIG. 9 is a perspective view of the optical fiber of FIG. 8, illustration (d), in accordance with the present invention.

Referring now to FIG. 8, illustrations (a)–(e), and FIG. 9, instead of one or more of the gratings 104,110 (FIG. 1), 144,146 (FIG. 5), the fiber receiving the reflected light 114 may have a region which is cleaved, notched or shaved (collectively, "notched") at an angle and orientation to allow the light 114 to enter into the fiber from the side. In that case, some or all of such a region may be coated with an anti-reflection (AR) coating, such as the surfaces 174,176, 178, 180,181 and/or coated with a reflective coating, such as on the surfaces 182,184,185. The notch 180 of FIG. 8, illustr. (d) is shown in perspective view in FIG. 9. Referring to FIG. 8, illustration (f), alternatively, the light 114 may be incident on a fiber without such a notch. In that case, the outer surface 186 of the fiber may be coated with an AR coating to reduce reflection of the incident light 114. The alternative embodiments of FIG. 8 illustr (a)–(f) may be employed with any of the fibers in any of the embodiments described herein. Further, alternatively, beam splitters, optical couplers (e.g., 3 dB couplers), prisms, or other optical devices may be used to achieve the same result of coupling light out of and/or into the fiber for any of the embodiments described herein.

The gap distances $x_1, x_2, y_1, y_2$ between the stator 12 and the rotor 14 are determined by measuring the intensity of the received (or reflected) light 114 for each sensor. More specifically, the magnitude of the measured light intensity varies as $1/R^2$ where R is the gap 15 distance between the outer surface of the stator 12 and the inner surface of the rotor 14 at the location of the optical sensor.

Figure 10:
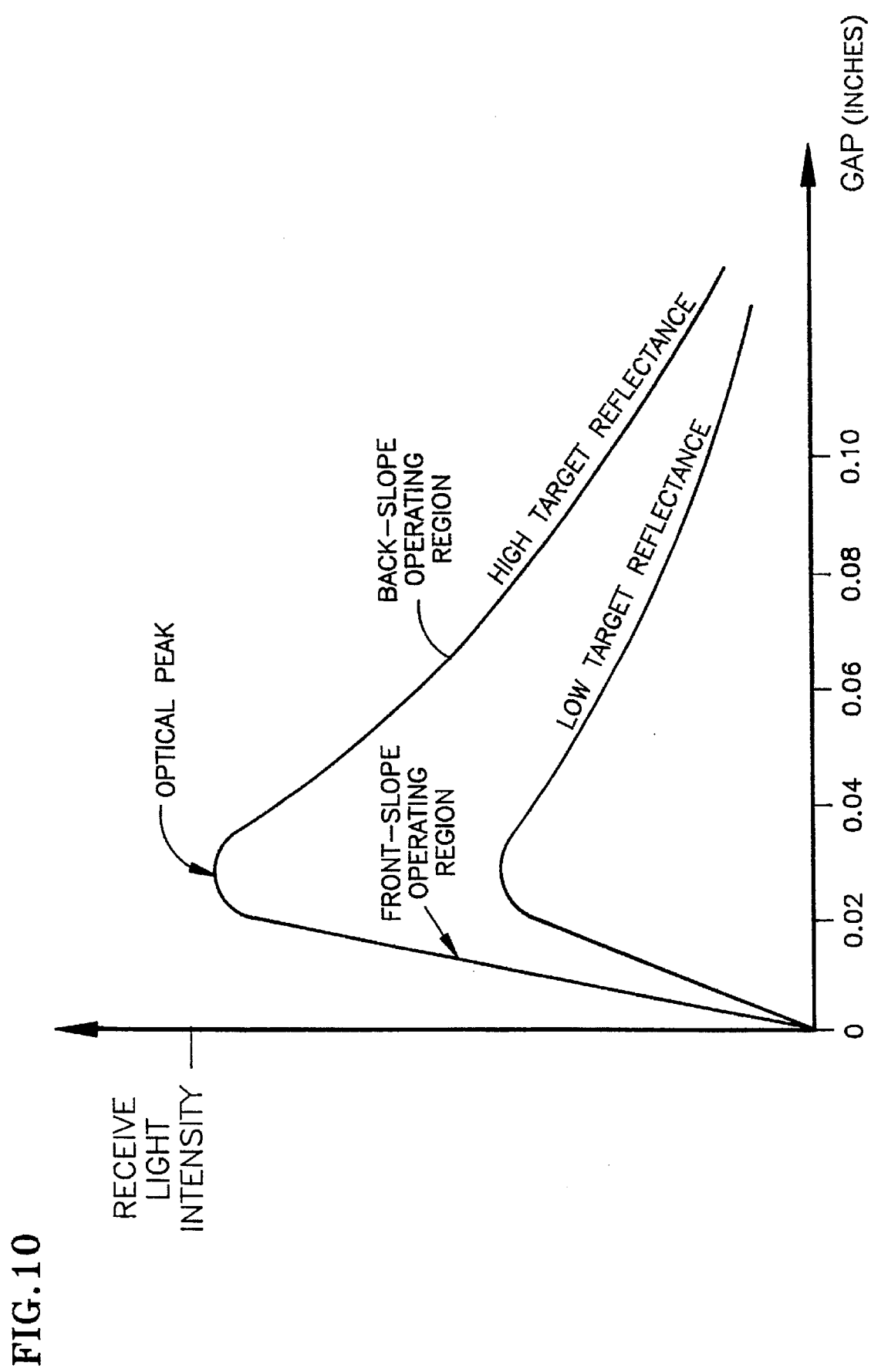
FIG. 10 is a graph of optical intensity received by a receive fiber against gap distance, in accordance with the present invention.

Referring now to FIG. 10, however, if the transmit and receive fibers are separate fibers and are located far apart as compared to the regions of reflected light from the transmit fiber, the intensity may actually increase as the gap 15 expands until the reflected light 114 is incident on the entire end face of the receive fiber. As the gap increases further, the intensity decreases as $1/R^2$. In that case, the optical intensity response exhibits a steep linear "front side" over a displacement range of about 0 to 0.02 inches, and a parabolic "back side" for displacements greater than about 0.02 inches. This principle is described in the articles: C. Menadier et al, "The Fotonic Sensor", Instruments & Control Systems, Vol. 40, pp 114–120 (June 1967); and G. Philips et al, "Rotating Machinery Bearing Analysis", Mechanical Engineering, pp 33 (July 1980), U.S. Pat. No. 3,327,584, entitled "Fiber Optic Proximity Probe", to C. Kissinger et al. Such references discuss this principle as it relates to optical distance measuring sensors employing a plurality (e.g., 12 to 600) transmit and receive fibers. Such sensors have a diameter which ranges from 0.040–2.4 inches. It should be understood that if a single fiber is used for both transmit and receive optical signals, such as the fiber 50 (FIG. 3) or one embodiment of the fiber 54 (FIG. 6), discussed hereinbefore, the intensity will vary only as $1/R^2$.

Figure 11:
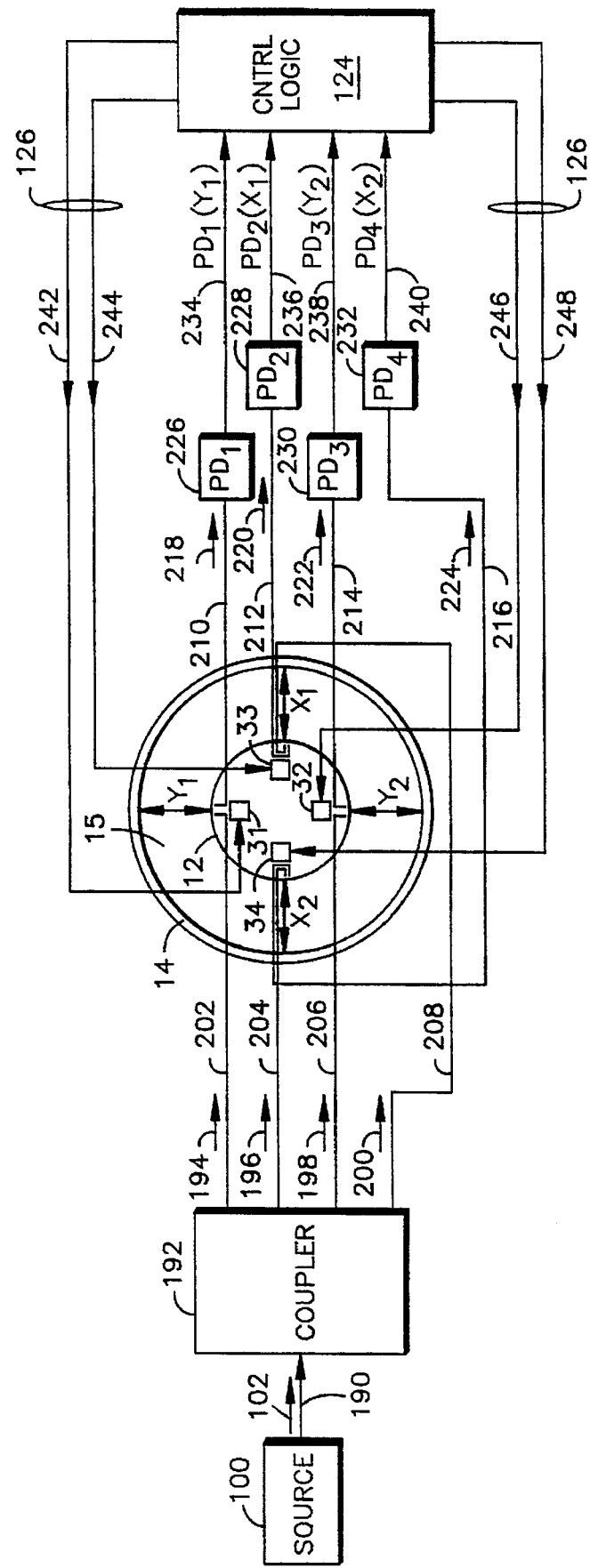
FIG. 11 is a schematic block diagram of four radial distance measurement sensors having separate transmit and receive fibers in accordance with the present invention.

Referring now to FIG. 11, a schematic diagram overview for four optical sensors placed symmetrically around the circumference of the gap 15, is shown. In this embodiment, the source 100 provides the source light 102 along an optical fiber 190 to an optical coupler 192. The optical coupler 192 splits the signal 102 into four optical signals 194,196,198, 200 along optical transmit fibers 202,204,206,208, respectively. The transmit fibers 202–208 may be the same as the transmit fibers 140,54 discussed hereinbefore. Each of the optical signals 194–200 exits the fibers 202–208 and reflects off the rotor 14 and enters a corresponding of return fiber 210–216, respectively, similar to or the same as the return fibers 142,167, discussed hereinbefore, as indicated by the lines 218–224, respectively. The optical signals 218–224 are fed to photodetectors 226–232, respectively, similar to or the same as the photodetector 120 discussed hereinbefore, which provide electrical output signals on lines 234–240, respectively, indicative of the intensity of the reflected (or return) light 218–224, respectively, incident thereon. The lines 234–240 are fed to the control logic 124 (discussed hereinbefore) which calculates the gap distances $x_1, x_2, y_1, y_2$ and provides electrical signals on lines 242,244,246,248 (collectively, the lines 126 (FIGS. 3, 4)) to the coils 31–34, respectively, to drive the gap distances to a uniform distance.

Figure 12:
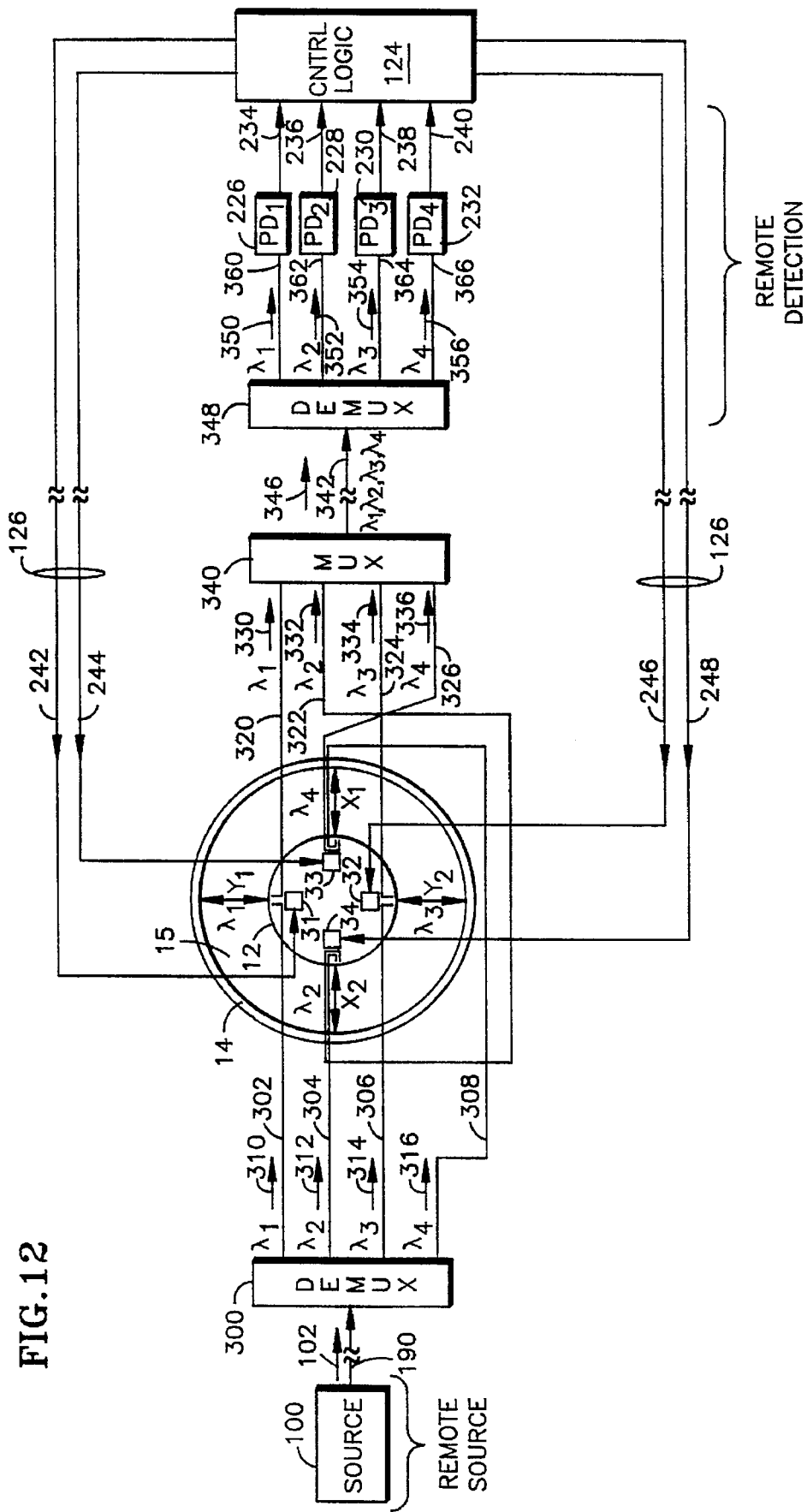
FIG. 12 is a schematic block diagram of a wavelength multiplexed plurality of optical sensors having remote source and detection, in accordance with the present invention.

Referring now to FIG. 12, in an alternative configuration, remote optical source and remote detection are provided by using a single optical fiber from the optical source 100 to the magnetic bearing and from the magnetic bearing back to the photodiodes. In that case, the source 100 provides a broad wavelength band source light 102 along the fiber 190 which extends along the length of the hollow portion 22 of the stator 12 and is fed to a known quad wavelength demultiplexer 300 which separates the signal 102 into four distinct wavelengths (or wavelength bands) $\lambda_1, \lambda_2, \lambda_3, \lambda_4$ along optical transmit fibers 302–308 as indicated by lines 310–316, respectively, which are fed to the stator 12 in a similar fashion to the fibers 202–208 of FIG. 11. The light signals 310–316 propagate along the transmit fibers 302–308 and are reflected off the rotor 14 and back to a series of optical receive fibers 320–326 as indicated by the lines 330–336, respectively, to a known optical wavelength multiplexer (or combiner; or mux) 340 which combines the wavelengths $\lambda_1-\lambda_4$ of the signals 330–336 onto an output fiber 342 as indicated by a line 346. The order in which the receive fibers 320–326 are fed to the mux 340 is not important because the input signals are all combined onto a single output fiber 342. The optical signal 346 travels along the fiber 342 and is fed to a remotely located optical demultiplexer 348 which demultiplexes the optical signal 346 back into the four wavelengths $\lambda_1-\lambda_4$ along optical fibers 350–356 as indicated by lines 360–366, respectively. The optical signals 350–356 are fed to the photodetectors 226–232, respectively, as discussed hereinbefore with FIG. 11, which provide electrical signals on the lines 234–240, respectively, indicative of the intensity of light incident thereon to the control logic 124.

Thus, the configuration of FIG. 12 provides for a remotely located source and remotely located detection/control components and requires only the single fiber 190 to provide the optical source or transmit light for all the optical sensors and the single fiber 342 to provide all the reflected or return optical signals from all the optical sensors to the detection and control section. Also, the source and detection components may be located at the same location, such location being remote from the bearing.

Figure 13:
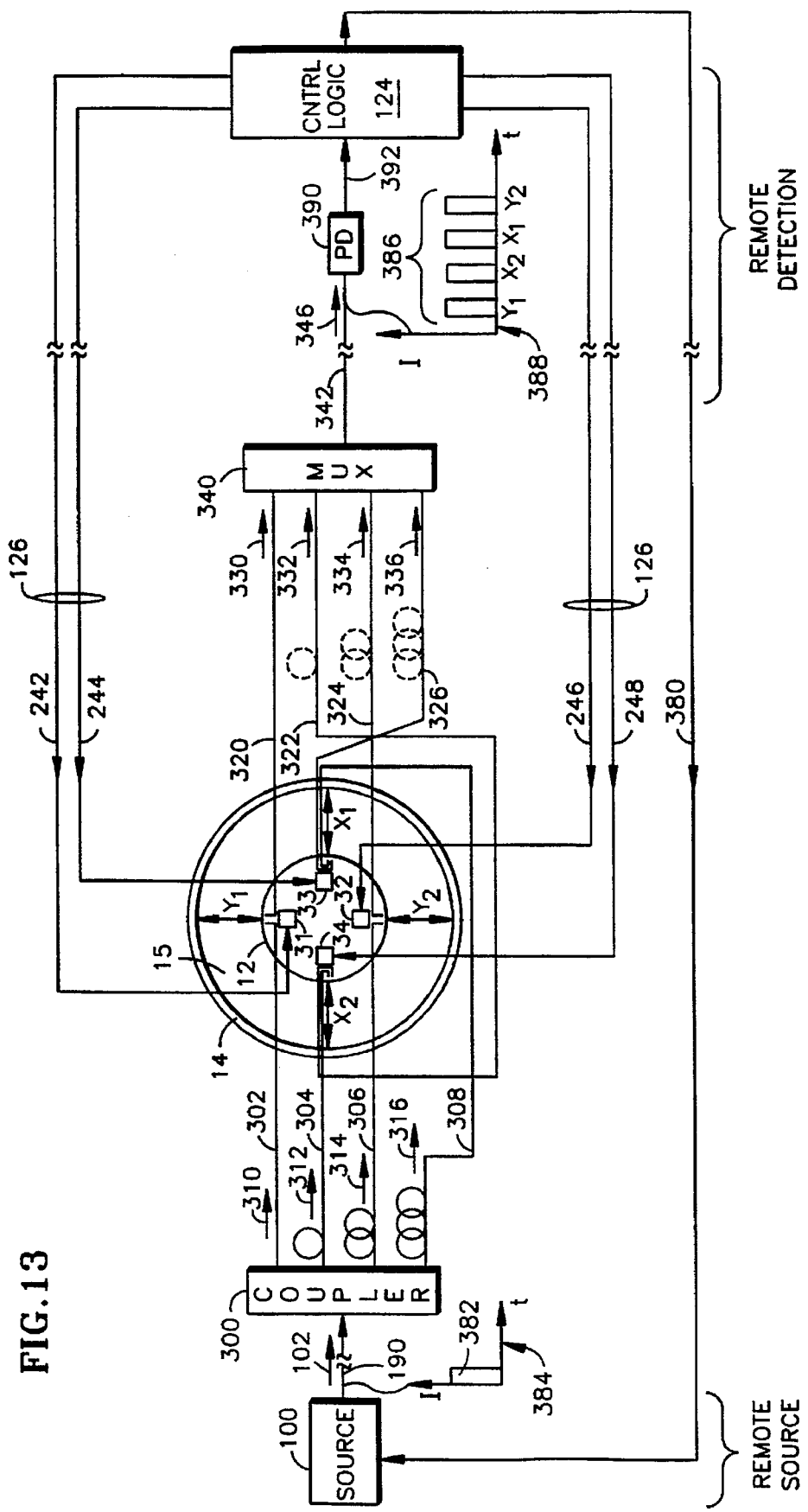
FIG. 13 is a schematic block diagram of a time multiplexed plurality of optical sensors having remote optical source and detection, in accordance with the present invention.
Figure 14:
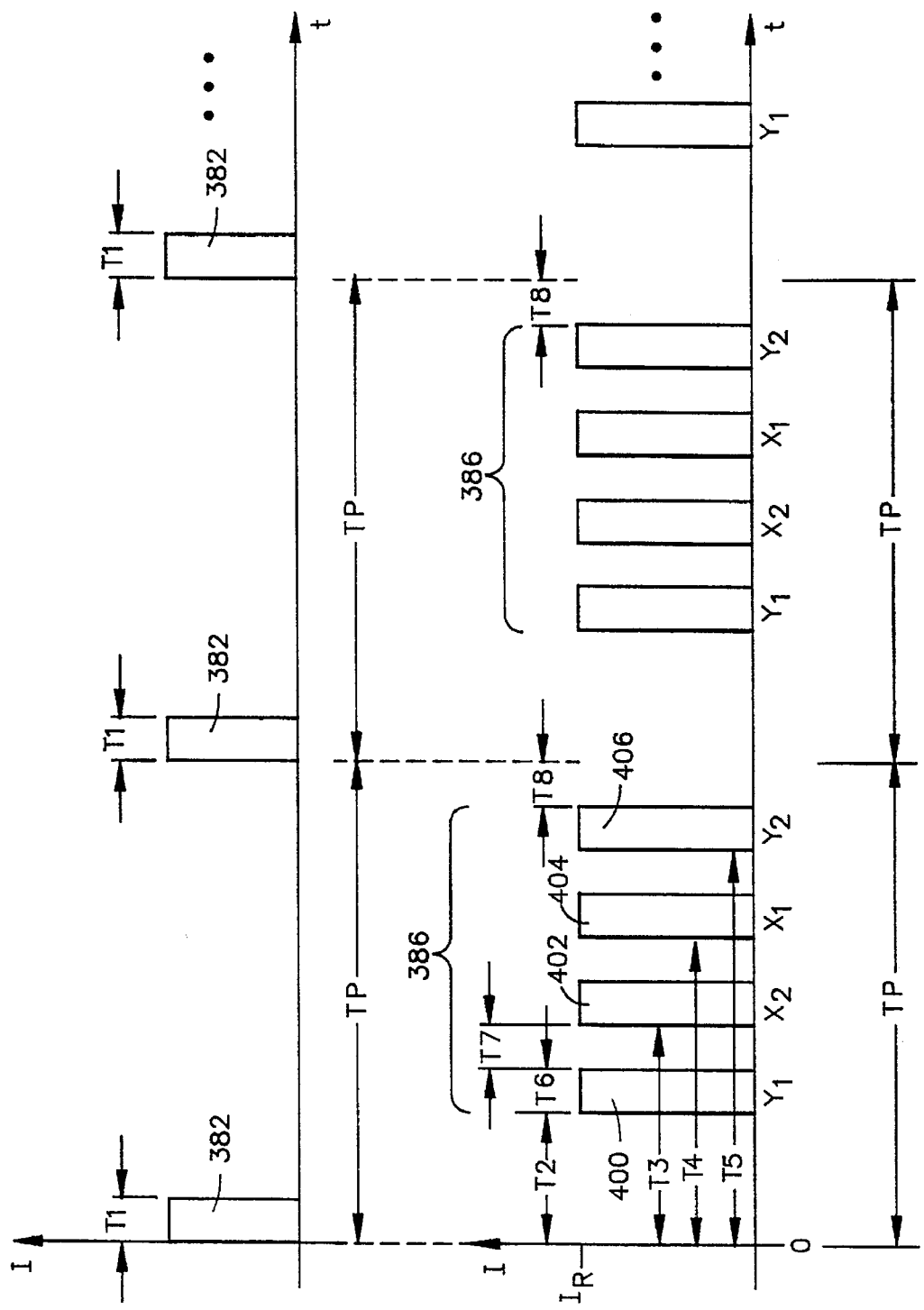
FIG. 14 is a timing diagram the time multiplexed system of FIG. 13, in accordance with the present invention.

Referring now to FIGS. 13 and 14, in an alternative embodiment, instead of using wavelength multiplexing to provide remote single fiber source and detection of the optical signals, time multiplexing may be used. In particular, the optical source 100 provides a pulse of light 382, as indicated by a graph 384 for the optical signal 102 in response to an electrical signal on a line 380 from the control logic 124. The pulse 382 is coupled to all the transmit fibers 302–308 (also in FIG. 12) by the coupler 192 (also in FIG. 11). However, in this case, the fibers 302–308 each have different lengths, 302 being the shortest fiber and 308 being the longest fiber. As a result, the signals 310–316 each comprise the pulse 382 which reaches the end of the respective fibers 302–308 delayed by a different amount due to the different lengths of the fibers 302–308.

The delayed pulse transmit signals 310–316 are reflected as the reflected optical signals 330–336 which comprise delayed optical pulses and which travel along the receive fibers 320–326 to the multiplexer 340 (also in FIG. 11). The multiplexer combines the delayed reflected optical signals 330–336 onto the output fiber 342 as the collective receive signal 346 which is a pulse train 186 as indicated by a graph 188. The order in which the receive fibers 320–326 are fed to the mux 340 is not important because the input signals are all combined onto a single output fiber 342. The time-multiplexed optical pulse train signal 346 is fed to a remotely located optical detector 390, such as any of the optical detectors discussed hereinbefore, which provides an electrical signal on a line 392, indicative of the time multiplexed intensity pulse train 386 of the reflected light from all the optical sensors on the magnetic bearing. The line 392 is fed to the control circuit 124 which provides electrical output signals on the lines 242–248 to drive the electromagnetic coils 31–34 on the magnetic bearing. The control circuit 124 measures the time from when it initiated the pulse 382 and determines which sensor is responding by the time elapsed. It should be understood that instead of or in addition to the transmit fibers 302–308 being unequal in length, the receive fibers 320–326 may be unequal in length. In that case both the transmit and receive fibers may contribute to the amount of time delay introduced into each signal. Alternatively, the photodetector 390 may be located locally next to the mux 340 and the line 392 may be a long length of electrical cable used to transmit electrical distance measurement signals from the detector 390 to the remotely located control logic 124.

Referring now to FIG. 14, more specifically, the initiating optical pulses 382 from the source 100 along the fiber 190 has a pulse width T1 and a repeat time period Tp. Also, the delayed pulse train 386 has a first pulse 400 which is delayed by a time T2 from the leading edge of the initiating pulse 382. The time delay T2 is determined by the length of the transmit and receive optical fibers 302,320, respectively. The delayed pulse train 386 has a second pulse 402 which is delayed by a time T3 from the leading edge of the initiating pulse 382. The time delay T3 is determined by the length of the transmit and receive optical fibers 304,322, respectively. The delayed pulse train 386 has a third pulse 404 which is delayed by a time T4 from the leading edge of the initiating pulse 382. The time delay T4 is determined by the length of the transmit and receive optical fibers 306,324, respectively. The delayed pulse train 386 has a fourth pulse 406 which is delayed by a time T5 from the leading edge of the initiating pulse 382. The time delay T5 is determined by the length of the transmit and receive optical fibers 308,326, respectively.

The pulse width T6 of the delayed pulses 400,402,404, 406 is the same as the pulse width T1 of the initiating pulse 382. Also, the time spacing T7 between the pulses 400–406 is determined by the aforementioned time delays T3,T3,T4, T5 and the pulse width T6 of the pulses 400–406. Further, the time spacing T8 between the trailing edge of the last pulse 406 and the next initiating pulse 382 is determined by the delay times T2,T3,T4,T5 and the pulse width T6 of the pulses 400–406.

Figure 15:
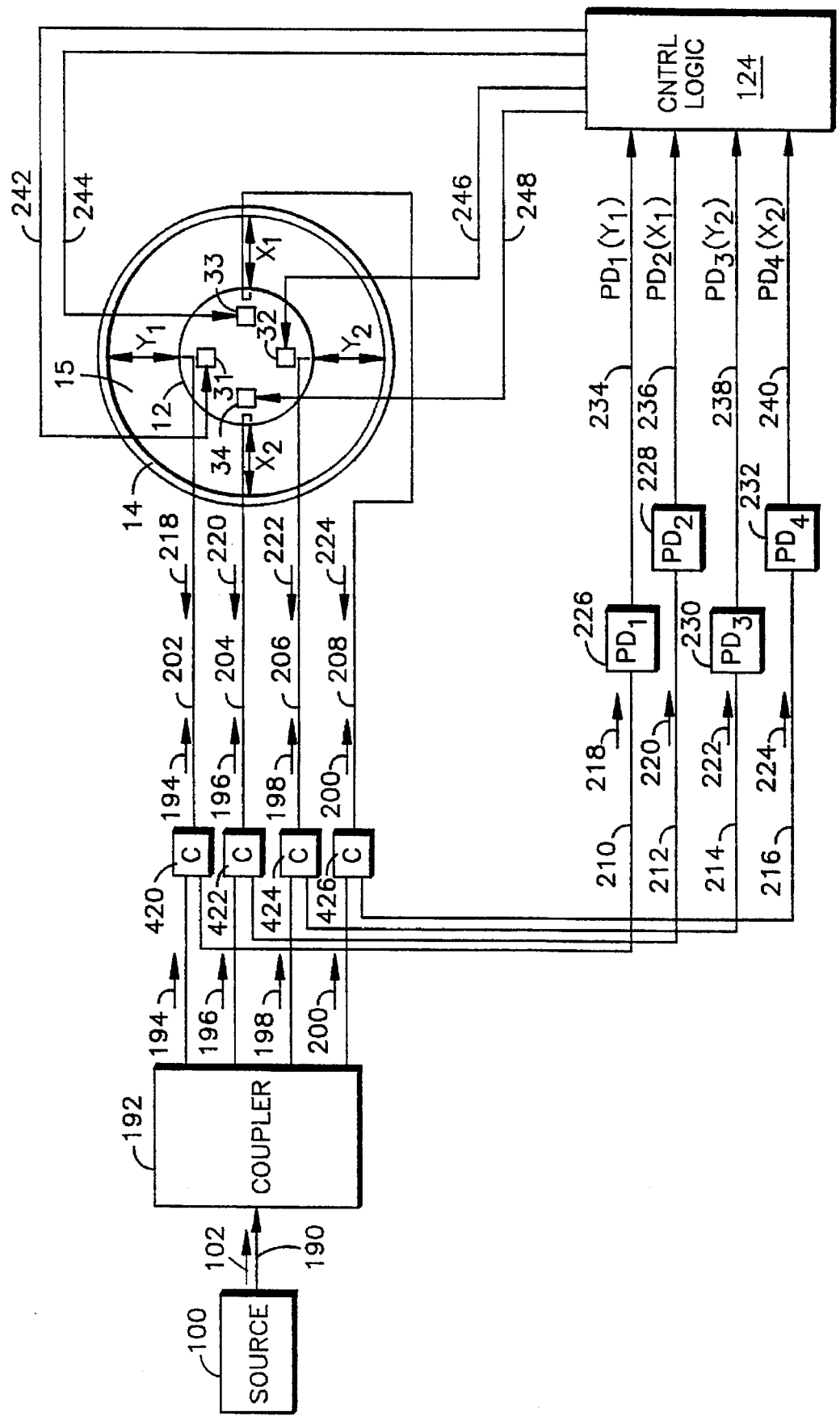
FIG. 15 is a schematic block diagram of a plurality of optical sensors each employing a single transmit/receive optical fiber in accordance with the present invention.
Figure 16:
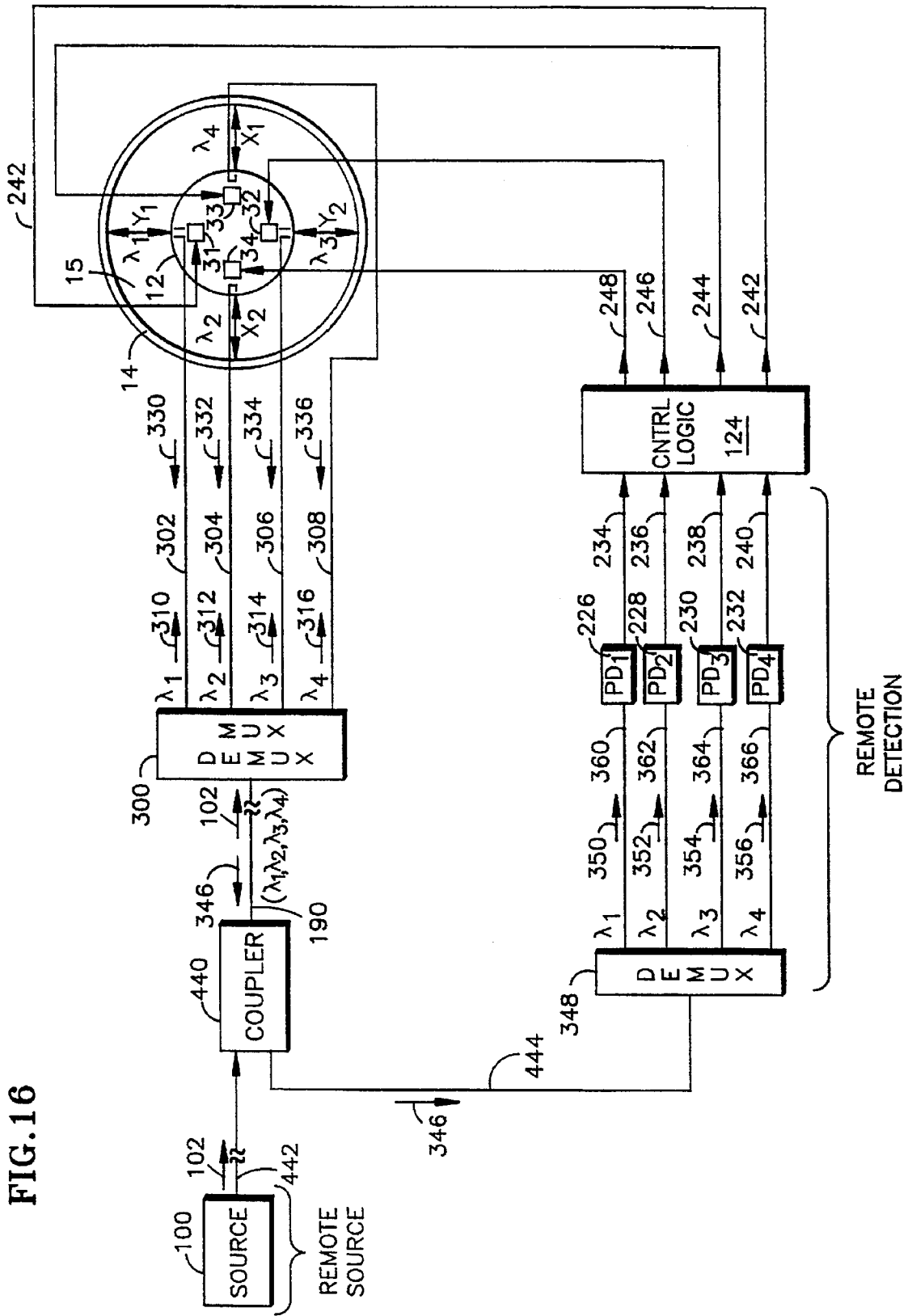
FIG. 16 is a schematic block diagram of a wavelength multiplexed single transmit/receive optical fiber in accordance with the present invention.
Figure 17:
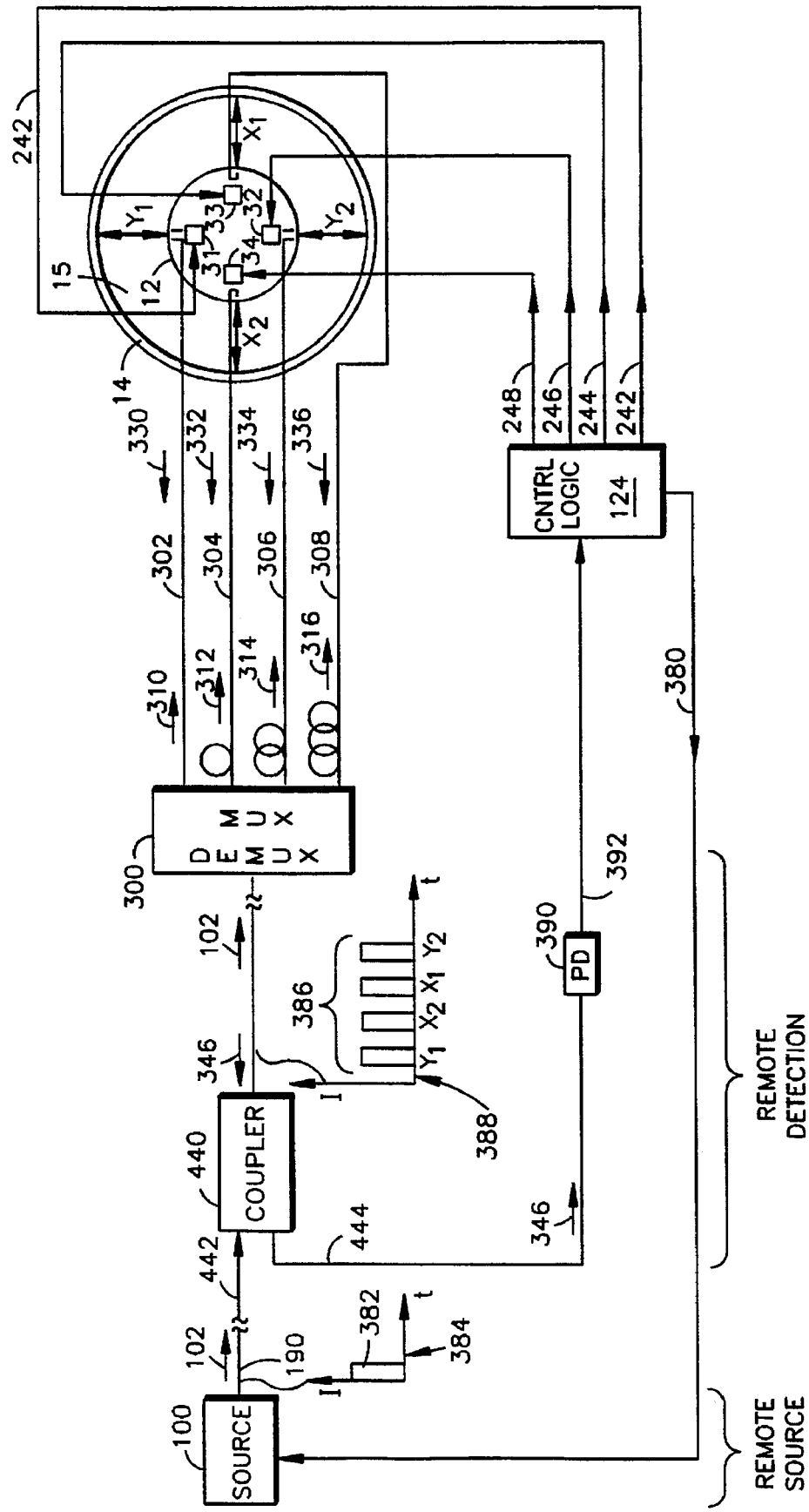
FIG. 17 is a schematic block diagram of a time multiplexed single transmit/receive optical fiber in accordance with the present invention.

Referring now to FIGS. 15,16, and 17, the embodiments shown in FIGS. 11,12, and 13 may employ a single fiber for both transmit and receive optical signals for each of the optical distance sensors as shown in FIGS. 15, 16, and 17, respectively. These embodiments minimize the amount of space taken up by each optical sensor.

In particular, FIG. 15 is similar to the embodiment of FIG. 11, except that in FIG. 15 the transmit fibers 202–208 also act as receive fibers for the reflected optical signals 218–224. Also, there are optical couplers 420–426 which couple the transmit signals 194–200 onto the transmit/receive fibers 202–208 and couple the receive signals 218–224 on the transmit/receive fibers 202–208 onto the fibers 210–216, which are fed to the photodetectors 226–232 as discussed hereinbefore.

Also, FIGS. 16 and 17 are similar to the embodiments of FIGS. 12 and 13, respectively, except that in FIGS. 16 and 17 the transmit fibers 302–308 also act as receive fibers for the reflected optical signals 330–336 and the demultiplexer 300 is bi-directional (acting also as a multiplexer/coupler). Also, there is an optical coupler 440, which may be remotely located, which couples the transmit signal 102 from a fiber 442 (connected to the source 100) onto the propagation fiber 190 and which couples the receive signal 346 (comprising multiple wavelengths in FIG. 16 and a pulse train in FIG. 17) from the propagation fiber 190 onto a fiber 444. The fiber 444 is fed to the demultiplexer 348 in FIG. 16 and to the photodetector 390 in FIG. 17. The rest of the system performs as discussed hereinbefore.

It should be understood that instead of the optical coupler 440 (FIGS. 16 and 17) or the optical couplers 420–426 (FIG. 15), any other optical coupling device may be used if desired, such as fiber-embedded angled gratings, beam splitters, notched fibers, etc., as discussed hereinbefore.

Further, it should be understood that any placement, orientation, or utilization of any of the optical fibers shown in FIGS. 1–10 may be employed in any of the embodiments of FIGS. 11–19.

Figure 18:
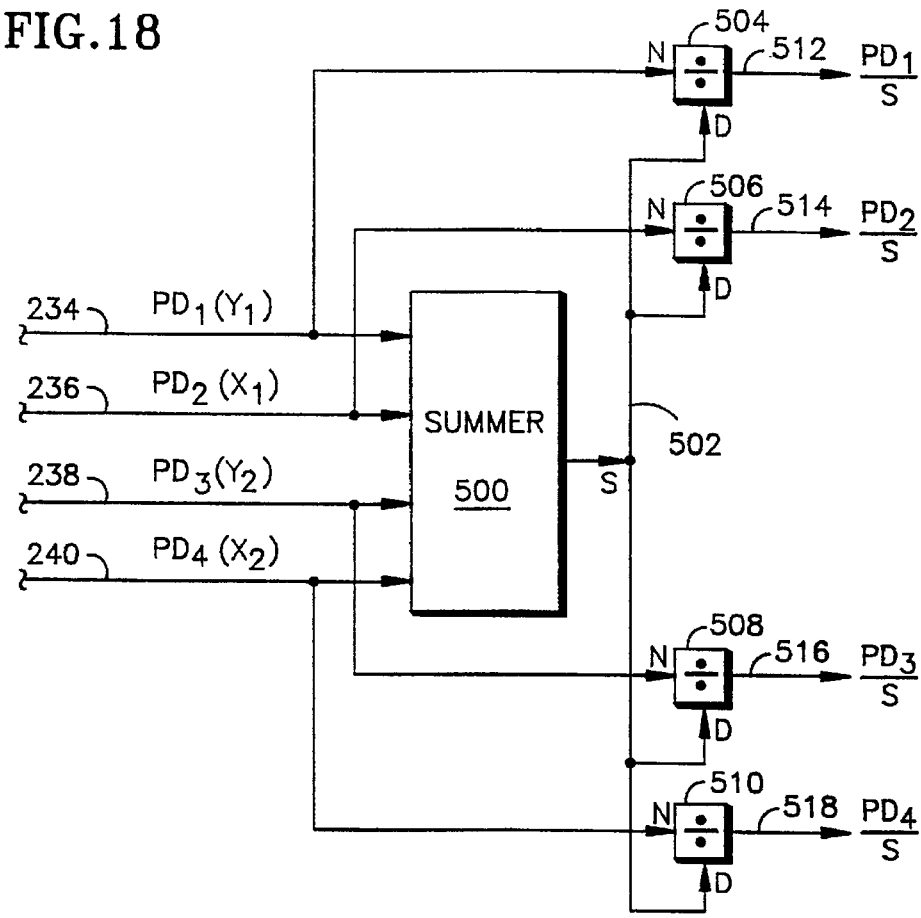
FIG. 18 is a schematic block diagram of a normalization circuit, in accordance with the present invention.

Referring now to FIG. 18, because the reflected light 114 (FIGS. 3–9) changes with time due to gradual changes in reflectivity over time caused by contamination, e.g., dirt, oxidation, etc., of the inner rotor surface, and due to fast variations in reflectivity as the gap distance changes (caused by changes in the angle of incidence of the transmit light onto the rotor), having more than one optical sensor around the circumference of the gap is desirable to allow for averaging and normalization of the optical signals as well as for fault tolerance.

When a plurality of optical sensors are used, a signal balancing network, such as that shown in FIG. 18, may be used to compensate for intensity variations. The electrical signals on the lines 234–240 from the photodetectors 226–232 are fed to a summing circuit 500 which provides an electrical signal on a line 502 indicative of the sum (S) of the signals on the lines 234–240. The electrical sum signal (S) on the line 502 is fed to the denominator input of four divider circuits 504–510. Also, the lines 234–240 are fed to the numerator of the dividers 504–510, respectively. The output of the dividers 504–510 are provided on lines 512–518, respectively.

If the signals on the lines 234–240 are indicated by the symbols $PD_1$, $PD_2$, $PD_3$, $PD_4$, respectively, and the output signal from the sum circuit 500 is indicated by the symbol S. The output signals 512–518 from the dividers 504–510 will be indicated by the relationship $PD_1/S$, $PD_2/S$, $PD_3/S$, $PD_4/S$, respectively. In particular, the four photodiode signals $PD_1$–$PD_4$ are summed and then each individual signal $PD_1$, $PD_2$, $PD_3$, $PD_4$ is divided by the sum (S) signal to normalize each output. This normalization scheme has maximum benefit when the noise is equally randomly distributed around the circumference of the gap 15 for all the gap distances $x_1$, $x_2$, $y_1$, $y_2$. This provides a filtering averaging technique such that if the sum of all the signals increases, e.g., due to a change in reflectivity of the rotor, the output signals ($PD_n/S$) will not change as much in response to such variation as without such normalization. Also, it allows the output signal to change proportionately due to normal perturbations which are exhibited for the individual distances $y_1, y_2, x_1, x_2$. In particular, for normal perturbations, the sum S stays the same because, due to the symmetry of the system, $y_1$ and $y_2$ change the same amount and in opposite directions (and similarly for $x_1$ and $x_2$).

A similar normalization technique will work for receive light signals in any of the embodiments discussed herein and for any number of sensors greater than one. However, the more sensors, the better the effects of such a normalization technique. Also, the number of sensors need not be the same as the number of poles on the stator.

Instead of using the single broad wavelength band source for the source 100, a plurality of narrow wavelength band sources (e.g., one for each wavelength), may be used, if desired. In that case, the power of the optical source light may likely be greater for each of the wavelengths and provide a stronger return signal.

The optical source 100 for all the embodiments herein may be a continuous wave (or CW) optical source or, alternatively, may be a pulsed source which is pulsed at a predetermined rate, e.g., 30 kHz. Other frequencies may be used if desired. If a pulsed optical signal is used, the pulse rate must be fast enough to allow the control logic 124 to modulate the current through the coils and control the distances $x_1$, $x_2$, $y_1$, $y_2$.

The distances for the gap 15 may be from 5–20 mils, and can be controlled to an accuracy of, e.g., 0.2 mils for some flywheel applications. Other gap sizes may be used if desired, depending on the application involved. Also, other optical distance measuring techniques, such as time-of-flight or chirped intensity or wavelength may be used if desired; however, such techniques may require more complicated and more costly hardware.

Regarding inserting the optical fibers radially into the stator, it is preferred to have the laminations 16 fully laminated and then holes drilled for the optical fibers after the lamination is complete. Alternatively, one or more sleeves may be placed radially between the laminations while the laminations are being fabricated and the fibers may then be inserted and glued into the sleeves, once the laminations are complete.

The optical fiber discussed herein are standard single spatial mode optical telecommunications fiber having a total (core and cladding) diameter of about 0.0049 inches (125 microns; 8 microns core diameter and 117 micron cladding thickness), without the outer jacket (or buffer), which is much smaller than the 0.25" diameter of the prior art inductive sensors and less than half the size of the smallest existing optical sensors (0.04"). Such a sensor allows for minimal diameter holes to be drilled in the laminations or support arms of the magnetic bearing, thereby minimizing the effect on magnetic circuit flux alterations in magnetic circuit performance of the magnetic bearing.

Other diameter fibers may be used if desired, however, the larger the diameter hole needed for the sensor, the greater the effect on performance of the magnetic flux circuits within the magnetic bearing. Fibers as small as 50 microns total diameter have been made and may be used herein. Also, other fiber types may be used if desired. For example, multiple spatial mode fibers may be used if desired; however, such fibers have a larger diameter than a single mode fiber. In that case, the transmit light may travel along one mode and the receive light may travel along another spatial mode in the same fiber. Also, in that case, one or more angled or straight Bragg gratings may be used to couple in and/or out light in one or more of the spatial modes of the fiber, such as is described in U.S. Pat. No. 5,048,913, entitled "Optical Waveguide Embedded Transverse Spatial Mode Discrimination Filter", to Glenn et al.

Instead of four optical sensors measuring four distances around a radial magnetic bearing, more or less sensors may be used if desired. However, the more sensors employed, the more error correction, and fault detection and reconfiguration may be performed.

Even though the invention has been described as being used with a magnetic bearing having both permanent and electro-magnets, and having an inner stator and an outer rotor, it should be understood that a permanent magnet is not required and that the orientation of the stator and rotor are not critical to the operation of the present invention. In particular, any type of magnetic bearing configuration may be used if desired. Also, the invention may also be used for axial magnetic bearings as well as radial magnetic bearings. Further, both members of the bearing may rotate in the same or opposite directions relative to each other. Still further, the invention will work equally well with any rotating machine which requires distance measurement has minimum space and/or cost requirements or must be immune to electromagnetic interference.

Also, in many magnetic bearing applications, the temperature of the stator must also be measured to determine, e.g., change in control conditions, maximum shutdown temperature, etc. Such temperature sensors take up additional space on the stator and/or rotor and add expense to the system.

Figure 19:
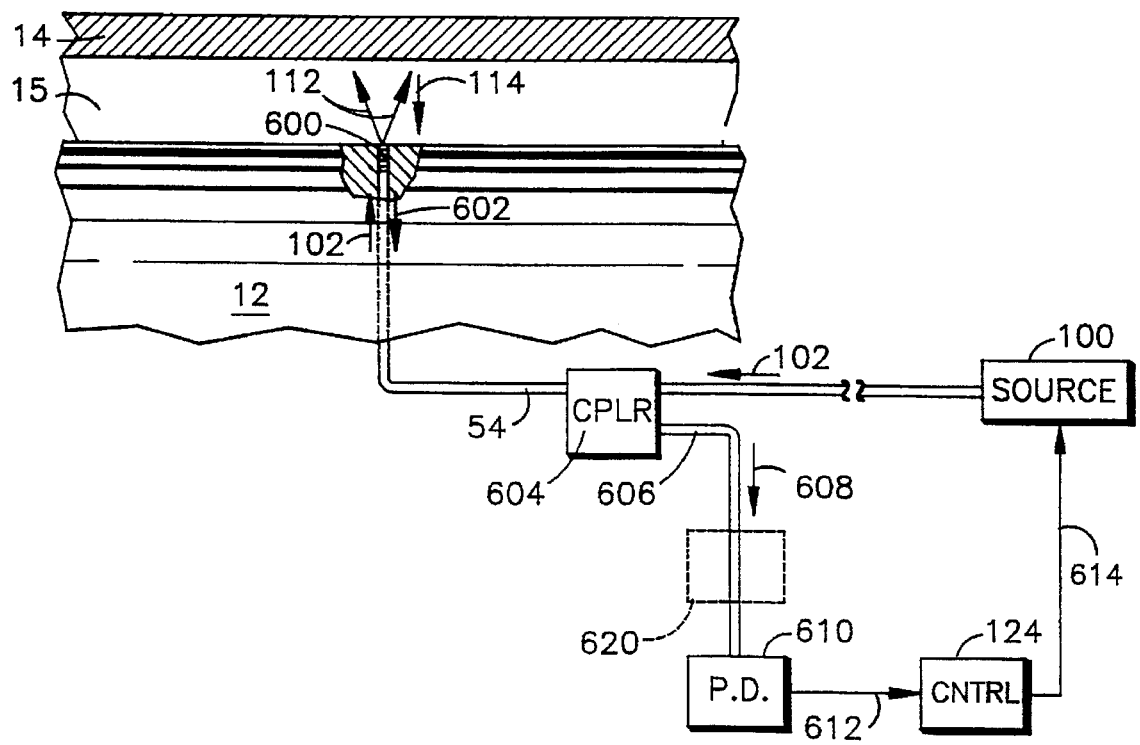
FIG. 19 is a side cutaway view of a radially mounted combined receive/transmit optical fiber having an embedded temperature sensor, in accordance with the present invention.

Referring now to FIG. 19, in addition to using the transmit and/or receive fiber(s) to measure the gap distance, they may also be used to measure temperature of the stator. In particular, a Bragg grating 600 having a reflection wavelength range of $\lambda t$ is impressed along the transmit and/or receive fiber 54 in a location where the temperature is desired to be measured, e.g., at the outer diameter of the stator. The light 102 from the source 100 also has energy in the reflection wavelength band $\lambda t$ of the grating 600. A portion of the light 102 in the wavelength range $\lambda t$ is reflected back along the fiber 54 as indicated by a line 602. The light 602 is incident on a coupler 604 which is similar to or the same as the coupler 164 of FIG. 6. The coupler 604 couples a predetermined amount of light onto a fiber 606 as indicated by a line 608 to a photodetector 610. The detector 610 provides an electrical signal on a line 612 to the control circuit 124, which calculates the temperature from the electrical signal on the line 612 (as discussed hereinafter). Alternatively, instead of the coupler 604, an angled fiber grating (not shown), such as the grating 104 discussed hereinbefore with FIG. 3, may be used to couple the reflected light 602 reflected by the grating 600 out from the fiber 54 to the optical detector 610. Also, instead of using the source 100 to provide the light in the wavelength band $\lambda t$, a separate source may be used if desired.

The temperature at the location of the grating 600 is determined based on a wavelength shift in the reflection wavelength $\lambda t$ of the grating 600 caused by changes in the temperature of the grating. Such a wavelength shift is caused primarily by changes in the periodicity of the refractive index variation of the grating as discussed in U.S. Pat. No. 4,761,073, entitled "Distributed, Spatially Resolving Optical Fiber Strain Gauge", to Meltz et al.

There are numerous ways to determine the temperature from the wavelength shift of the grating 600. For example, the control circuit 124 may provide an electrical output signal on a line 614 to the source 100 which controls the wavelength of the signal 102 from the source 100 within the temperature wavelength shift range. In that case, the control 124 scans a range of wavelengths to determine the wavelength of peak intensity from which it correlates to temperature. One such source wavelength scanning technique is described in U.S. Pat. No. 5,401,956, entitled "Diagnostic System for Fiber Grating Sensors", to Dunphy et al. Alternatively, the light 608 is incident on an optical filter 620 having a linear (or other predetermined shape) attenuation response profile over the temperature wavelength shift range. In that case, the output voltage on the line 612 from the photodetector 610 would be proportional to temperature. One such linear optical filter technique is described in U.S. Pat. No. 5,426,297, entitled "Multiplexed Bragg Grating Sensors", to Dunphy et al. Further, alternatively, the optical signal 608 may be fed to an optical spectrum analyzer (not shown) to determine the wavelength shift and the corresponding temperature change.

It should be understood that the temperature measurement function described herein is performed with the same transmit/receive fiber(s) as that used in any of the embodiments described herein for the position measurement, and done concurrently with the such distance measurement. Thus, any of the embodiments with any of the optical or electronic components discussed herein may be used concurrently with the components shown in FIG. 19 and/or discussed with respect to FIG. 19. Also, the wavelength range over which the grating 600 shifts over temperature is selected to not overlap with the wavelength band used for transmit and/or receive fibers in the distance measurement function. Also, if separate transmit and receive fibers are used, temperature sensing may be performed with Bragg gratings embedded in either or both fibers.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A magnetic bearing, comprising:

a stator;

a rotor, concentrically located with respect to said stator, which rotates relative to said stator, there being a variable gap between said rotor and said stator and electromagnetic forces acting between said stator and said rotor which adjust said gap;

a plurality of optical transmit/receive means, disposed on said stator, each receiving and propagating a corresponding transmit light, for launching said transmit light across said gap, said transmit light being reflected off of said rotor as receive light, and each receiving and propagating said receive light, the intensity of said receive light being indicative of said gap; and detection means, responsive to said receive light from each of said transmit/receive means, for coupling said receive light from each of said transmit/receive means onto a single optical waveguide and for providing at least one electrical receive signal indicative of the intensity of said receive light from predetermined ones of said transmit/receive means.

2. The magnetic bearing of claim 1 wherein each of said optical transmit/receive means comprises two separate optical fibers, said separate fibers comprising a transmit fiber for receiving and propagating said transmit light and a receive fiber for receiving and propagating said receive light.

3. The magnetic bearing of claim 2 wherein:

each of said receive lights comprises a corresponding predetermined wavelength; and said detection means comprises:

an optical multiplexer, responsive to each of said receive lights, providing an optical mux signal on said single waveguide indicative of a combination of said wavelengths of said receive lights; and an optical receive wavelength demultiplexer, responsive to said mux signal located remote from said multiplexer, providing a plurality of optical demux signals each indicative of said wavelength of said receive light from a corresponding one of said transmit/receive means; and a plurality of photodetectors, each responsive to a corresponding one of said demux signals and each providing a corresponding one of said electrical receive signals indicative of said receive light from a corresponding one of said transmit/receive means.

4. The magnetic bearing of claim 2 wherein:

each of said receive lights comprises optical pulses; and said detection means comprises:

an optical multiplexer, responsive to each of said receive lights, providing an optical mux signal on said single waveguide indicative of a combination of said optical pulses of said receive lights, said mux signal comprising an optical pulse train where the intensity of each optical pulse in said pulse train is indicative of the intensity of said receive light from a corresponding one of said transmit/receive means; and a photodetector, responsive to said mux signal, providing said electrical receive signal indicative of said pulse train.

5. The magnetic bearing of claim 4 wherein said photodetector is located remote from said multiplexer.

6. The magnetic bearing of claim 4 further comprising:

a plurality of electromagnetic coils disposed on said stator; and control means, responsive to said receive signals, for providing electrical control signals to said coils to adjust said gap.

7. The magnetic bearing of claim 6:

wherein said control means comprises means for providing an electrical pulse signal; and further comprising optical source means, for providing an optical transmit pulse as said transmit light to each of said transmit/receive means in response to said electrical pulse signal; and wherein each of said transmit/receive means comprises delay means for delaying each of said optical transmit pulses a different amount such that said optical mux signal comprises said pulse train.

8. The magnetic bearing of claim 2 further comprising optical source means, for providing said transmit light to each of said transmit/receive means.

9. The magnetic bearing of claim 8 wherein said source means comprises:

an optical source providing said transmit light; and optical coupling means responsive to said transmit light for coupling said transmit light onto each of said transmit/receive means.

10. The magnetic bearing of claim 9 wherein said optical source is located remote from said coupling means.

11. The magnetic bearing of claim 9 wherein said optical coupling means comprises an optical coupler.

12. The magnetic bearing of claim 9 wherein said optical coupling means comprises an optical source wavelength demultiplexer which couples predetermined wavelengths of said transmit light onto predetermined ones of said transmit/ receive means.

13. The magnetic bearing of claim 1 wherein each of said optical transmit/receive means comprises a single optical transmit/receive fiber for receiving and propagating said transmit light and for receiving and propagating said receive light.

14. The magnetic bearing of claim 13 wherein:

each of said receive lights comprises a corresponding predetermined wavelength; and said detection means comprises:
- an optical multiplexer, responsive to each of said receive lights, providing an optical mux signal on said single waveguide indicative of a combination of said wavelengths of said receive lights; and
- an optical receive wavelength demultiplexer, responsive to said mux signal located remote from said multiplexer, providing a plurality of optical demux signals each indicative of said wavelength of said receive light from a corresponding one of said transmit/receive means; and
- a plurality of photodetectors, each responsive to a corresponding one of said optical demux signals and each providing a corresponding one of said electrical receive signals indicative of said receive light from a corresponding one of said transmit/receive mean.

15. The magnetic bearing of claim 14 wherein said detection means comprises coupling means for coupling said mux signal to said wavelength demultiplexer.

16. The magnetic bearing of claim 15:

further comprising optical source means for providing said transmit light to said coupling means; and wherein said coupling means is bi-directional and couples said transmit light to said optical multiplexer; and wherein said optical multiplexer is bi-directional and couples predetermined wavelengths of said transmit light onto predetermined ones of said transmit/receive means.

17. The magnetic bearing claim 16 wherein said coupling means, said source means, said demultiplexer, and said photodetectors are located remote from said multiplexer.

18. The magnetic bearing of claim 13 wherein:

each of said receive lights comprises optical pulses; and said detection means comprises:
- an optical multiplexer, responsive to each of said receive lights, providing an optical mux signal on said single waveguide indicative of a combination of said optical pulses of said receive lights, said mux signal comprising an optical pulse train where the intensity of each optical pulse in said pulse train is indicative of the intensity of said receive light from a corresponding one of said transmit/receive means; and
- a photodetector, responsive to said mux signal, providing said electrical receive signal indicative of said pulse train.

19. The magnetic bearing of claim 18 wherein said detection means comprises coupling means for coupling said mux signal to said photodetector.

20. The magnetic bearing of claim 19 further comprising:

a plurality of electromagnetic coils disposed on said stator; and control means, responsive to said receive signals, for providing electrical control signals to said coils to adjust said gap.

21. The magnetic bearing of claim 20:

wherein said control means comprises means for providing an electrical pulse signal; and further comprising optical source means for providing an optical transmit pulse as said transmit light to said coupling means in response to said electrical pulse signal;

wherein said coupling means is bi-directional and couples said transmit pulse to said optical multiplexer;

wherein said optical multiplexer is bi-directional and couples said optical transmit pulse onto each of said transmit/receive means; and wherein each of said transmit/receive means comprises delay means for delaying each of said optical transmit pulses a different amount such that said optical mux signal comprises said pulse train.

22. The magnetic bearing of claim 21 wherein said coupling means, said source means and said photodetector are located remote from said multiplexer.

23. The magnetic bearing of claim 13 further comprising optical source means, for providing said transmit light to each of said transmit/receive means.

24. The magnetic bearing of claim 23 wherein said source means comprises:

an optical source providing said transmit light; and optical coupling means responsive to said transmit light for coupling said transmit light onto each of said transmit/receive means.

25. The magnetic bearing of claim 1 wherein each of said optical transmit/receive means comprises at least one Bragg grating for launching said transmit light across said gap.

26. The magnetic bearing of claim 1 wherein each of said optical transmit/receive means comprises at least one Bragg grating for receiving said receive light into said transmit/ receive means.

27. The magnetic bearing of claim 1 further comprising optical temperature means, disposed within at least one of said transmit/receive means, responsive to a temperature light signal being a portion of said transmit light, for reflecting a predetermined amount of said temperature light signal back along said transmit/receive means, said temperature light signal having a reflection wavelength indicative of the temperature of said temperature means.

28. The magnetic bearing of claim 27 wherein said temperature means comprises a Bragg grating.

29. The magnetic bearing of claim 1 further comprising:

a plurality of electromagnetic coils disposed on said stator; and control means, responsive to said receive signals, for providing electrical control signals to said coils to adjust said gap.

30. The magnetic bearing of claim 29 wherein said control means comprises normalizing means for normalizing at least two of said receive signals.

31. The magnetic bearing of claim 30 wherein said normalizing means comprises means for dividing at least one of said receive signals by the sum of at least two of said receive signals.

32. The magnetic bearing of claim 29 wherein said gap is a radial gap between said rotor and said stator.

* * * * *

UNITED STATES PATENT AND TRADEMARK OFFICE
CERTIFICATE OF CORRECTION

PATENT NO. : 5,640,472
DATED : June 17, 1997
INVENTOR(S) : Richard A. Meinzer et al.

It is certified that error appears in the above-identified patent and that said Letters Patent is hereby corrected as shown below:

Column 4, line 62, "116" should read --16--.

Column 5, line 26, "counter-clockwise" should read --clockwise--.

Column 7, line 27, reference "56" should read --53--.

Column 7, line 32, reference "50" should read --140--.

Column 8, lines 8-9, delete "If" and change "the" to read --The--.

Column 10, line 29, "fibers 350-356 as indicated by lines 360-366" should read --fibers 360-366 as indicated by lines 350-356--.

Column 11, line 45, the first reference of "T3" should read --T2--.

<u>In the Drawings:</u>

Delete figs. 3,4, and 6 and substitute therefor figs. 3, 4, and 6, as shown on the attached pages.

Signed and Sealed this

First Day of September, 1998

Attest:

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO : 5,640,472
DATED : June 17, 1997
INVENTOR(S): Richard A. Meinzer et al.

Page 2 of 3

It is certified that error appears in the above-identified patent and that said Letters Patent is hereby corrected as shown below:

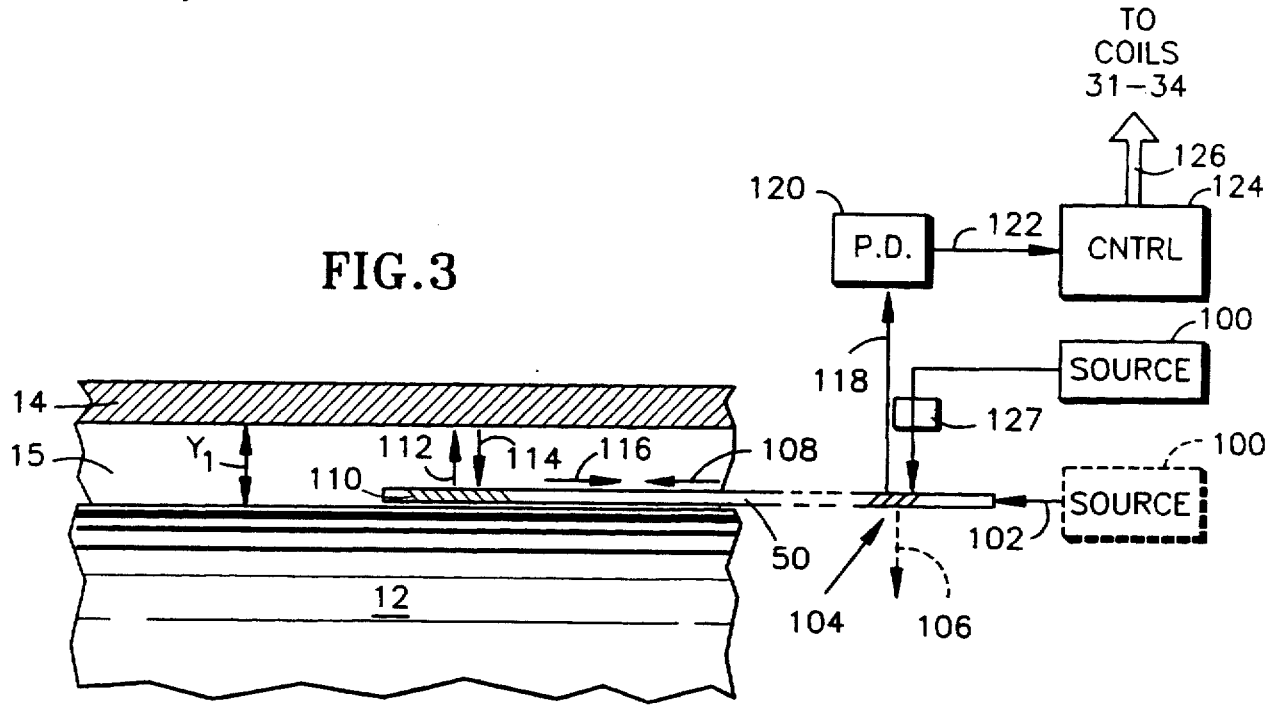

UNITED STATES PATENT AND TRADEMARK OFFICE
CERTIFICATE OF CORRECTION

PATENT NO : 5,640,472
DATED : June 17, 1997
INVENTOR(S): Richard A. Meinzer et al.

Page 3 of 3

It is certified that error appears in the above-identified patent and that said Letters Patent is hereby corrected as shown below:

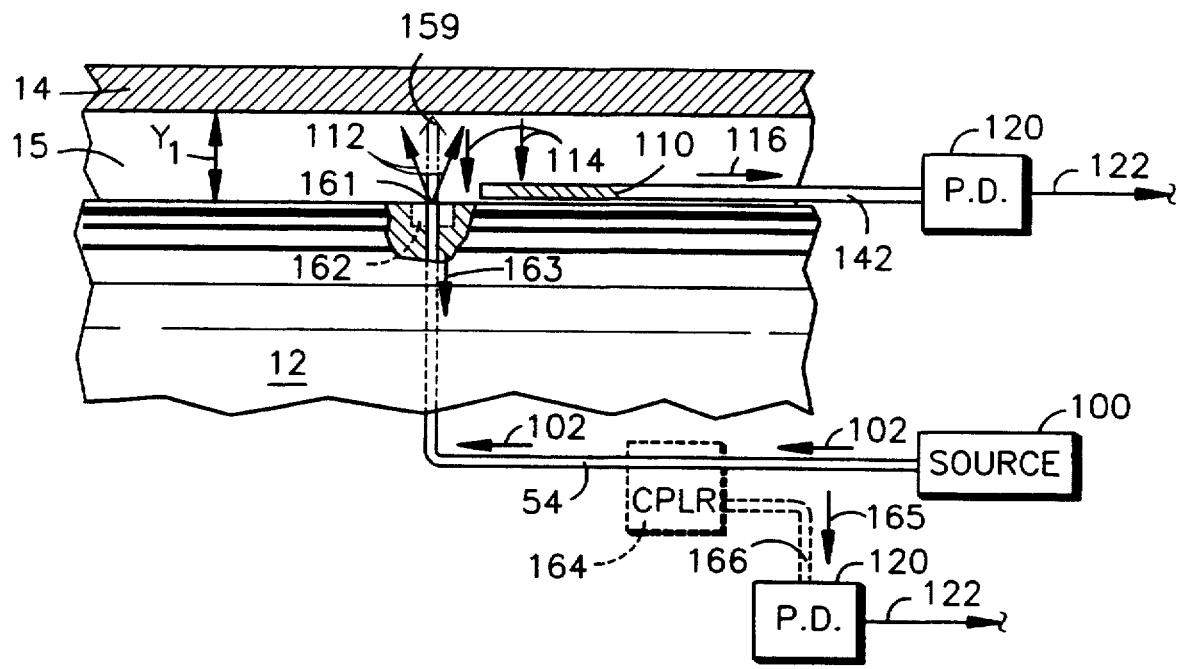

FIG.6